(12) United States Patent
Takahashi

(10) Patent No.: US 7,711,911 B2
(45) Date of Patent: May 4, 2010

(54) SEMICONDUCTOR STORAGE DEVICE DETECTING CHANGE OF MEMORY CONTENT AND INFORMATION PROCESSING DEVICE INCLUDING SEMICONDUCTOR STORAGE DEVICE DETECTING CHANGE OF MEMORY CONTENT

(75) Inventor: Hajime Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 732 days.

(21) Appl. No.: 11/602,976

(22) Filed: Nov. 22, 2006

(65) Prior Publication Data

US 2008/0065793 A1      Mar. 13, 2008

(30) Foreign Application Priority Data

Jul. 12, 2006    (JP) ............................. 2006-191597

(51) Int. Cl.
  *G06F 12/16*    (2006.01)
  *G06F 7/02*     (2006.01)

(52) U.S. Cl. .................. 711/162; 711/105; 326/41; 365/189.16; 365/233.5

(58) Field of Classification Search .............. 711/105, 711/162; 326/52; 365/49.17, 233.5
See application file for complete search history.

(56) References Cited

U.S. PATENT DOCUMENTS 6,515,913 B2 *   2/2003   Kajigaya et al. ....... 365/189.02
6,717,877 B2 *   4/2004   Suzuki et al. .......... 365/210.12
6,867,989 B1 *   3/2005   Roy .......................... 365/49.17
2001/0014051 A1 * 8/2001  Watanabe et al. ....... 365/230.03
2002/0062433 A1 * 5/2002  Suzuki ........................ 711/203
2002/0105821 A1 * 8/2002  Gray ............................ 365/49
2003/0079085 A1 * 4/2003  Ang ............................. 711/122
2004/0105299 A1 * 6/2004  Joshi ........................... 365/154
2005/0083725 A1 * 4/2005  Regev et al. ................. 365/154
2005/0131990 A1 * 6/2005  Jewell ......................... 709/201
2006/0010284 A1 * 1/2006  Srinivasan et al. .......... 711/108

FOREIGN PATENT DOCUMENTS

JP         08-036501       2/1996
JP         10-207849       8/1998
JP         2002-342298     11/2002

* cited by examiner

*Primary Examiner*—Matt Kim
*Assistant Examiner*—Hal Schnee
(74) *Attorney, Agent, or Firm*—Fujitsu Patent Center

(57) ABSTRACT

A single information processing device capable of configuring an information system that maintains matching between information retained by a self device and information retained by a partner device in a way that links up a plurality of information processing devices with each other, has a storage unit including a memory cell retaining a predetermined quantity of information and a comparing unit that compares the information retained by the memory cell at the present with information written afresh to the memory cell, an extraction unit extracting the information written afresh to the memory cell about which the comparing unit judges that the information retained at the present is different from the information written afresh, and a transmitting unit transmitting the extracted information to the partner device linking up with the self device.

3 Claims, 22 Drawing Sheets

FIG. 20

| ADDRESS | ORIGINAL DATA | WRITE DATA |
|---|---|---|
| A | 36782ADD96457788 | 0000000000000000 |
| B | 590CC22300FEDFAA | 0000000000000000 |
| C | 154679DEF5643345 | 0000000000000000 |
| F | 89DE67AA9078FEDC | CCEF5678 1290ACDE |
| F+1 | 990087DEEF332190 | 99AC87DEEF332190 |
| F+2 | FED89765CCA3E689 | FED8976500000000 |
| ... | ------- | ------- |
| L-2 | 0000000000000001 | 0000000000000002 |
| L-1 | 00000000000000FF | 00000000000000FF |
| L | 0000000000000800 | 0000000000000800 |
| X | CCDD678965FEADC8 | CCDD678965FEADC8 |
| Y | 998FF456ACDEF890 | 9909FFED56ACDE46 |
| Z | 7777999675FCEDAC | |

| ADDRESS | BYTE MARK | DATA |
|---|---|---|
| ... | | |
| F | 1111 1111 | CCEF5678 1290ACDE |
| F+1 | 0100 0000 | 99AC87DEEF332190 |
| F+2 | 0000 1111 | FED8976500000000 |
| ... | | |
| L-2 | 0000 0001 | 0000000000000002 |
| L-1 | 1000 0000 | 80000000000000FF |
| | | |
| | | |
| | | |
| | | |

SEMICONDUCTOR STORAGE DEVICE DETECTING CHANGE OF MEMORY CONTENT AND INFORMATION PROCESSING DEVICE INCLUDING SEMICONDUCTOR STORAGE DEVICE DETECTING CHANGE OF MEMORY CONTENT

BACKGROUND OF THE INVENTION

The present invention relates to a semiconductor storage device and an information processing device including the semiconductor storage device.

Communication devices such as routers and load balancers are dualized (into an active/standby system) in preparation against a fault. Then, take-over information is constantly transferred between an active device and a standby device so that the standby device can continue the process even if the active device falls into the fault. FIG. 1 is a diagram showing a state of how the take-over information is transferred between a load balancer A serving as the active device and a load balancer B serving as the standby device. In FIG. 1, the dualization is implemented, and hence, even if the load balancer A gets into the fault, the load balancer B can continue the process in succession. The take-over information represents, for example, session information of communications.

FIG. 2 is a diagram illustrating a state of how the session information defined as the take-over information is transferred to the load balancer B from the load balancer A. In the event of the fault of the active device, the communications of the information of which the transfer between the active device and the standby device is not yet completed, are unable to continue and get interrupted. In FIG. 3, part of the take-over information is transferred to the load balancer B from the load balancer A, while part of the take-over information is not transferred to the load balancer B from the load balancer A. Namely, when the take-over information is transferred to a main memory of the load balancer B from a main memory of the load balancer A, information an area X in FIG. 3 is lost. In this case, the information to be lost is desired to be small in size.

[Patent document 1] Japanese Patent Application Laid-Open Publication No.8-36501

[Patent document 2] Japanese Patent Publication No.3467750

[Patent document 3] Japanese Patent Application Laid-Open Publication No.2002-342298

SUMMARY OF THE INVENTION

As shown in FIG. 4, an operating system (OS) and an application have hitherto taken charge of the process of taking over the session information. In a case where the software such as the application and the operating system transfers the take-over information, such a problem arises that the processing is slow. Further, this is also a process that increases a load in terms of essential jobs (load sharing etc).

FIG. 5 shows a data flow of the take-over information. As shown in FIG. 5, the take-over information flows through a system control unit (chipset) 2 from a memory (Memory) 1 of the active device and is transferred to outside via an interface card such as a NIC (Network InterfaceCard) 3. Further, in DMA (Network Interface Card) transfer using the NIC without any intermediary of a CPU (Central Processing Unit) 4, it is impossible to recognize that rewriting to the memory 1 is conducted. Therefore, in the DMA transfer using the NIC 3, only a mechanical copying operation can be done, and hence a great quantity of futility occurs in the transfer. Moreover, the DMA transfer involves employing system resources (a system bus, a memory bus, etc). Furthermore, in the case of increasing a copying frequency, the CPU 4 can not access the memory 1 during the DMA transfer, and therefore essential jobs of the CPU 4 are affected.

In a case where the data transfer is executed mainly by hardware, for instance, there is a method of conducting the DMA transfer by setting a memory range in which the data should be transferred to the NIC 3. FIG. 6 is a diagram showing a data flow of the take-over information in the case of performing the DMA transfer. In FIG. 6, the memory range starting from an Address A to an Address B is set in the NIC 3. In this case, data of the take-over information designated by the Address A through the Address B is DMA-transferred. In the case of this method, timing of performing the DMA transfer is a matter of problem. If the DMA transfer is periodically carried out, the control is simplified. It, however, follows that the system resources are used with futility. Further, the DMA transfer is performed irrespective of whether the rewriting to the memory 1 is done or not, and consequently the great quantity of futility occurs in the transfer.

Further, for example, there is a method of performing the DMA transfer by setting the memory range in which the data should be transferred to the system control unit. This method is that a target range is transferred to the NIC 3 by snooping the writing operation to the memory 1. FIG. 7 is a diagram illustrating a data flow of the take-over information in the case of conducting the DMA transfer by setting the memory range in which the data should be transferred to the system control unit 2. In FIG. 7, the memory range of the Address A through the Address B is set in the system control unit. In this case, the system control unit snoops the address in which the CPU 4 executes writing to the memory 1. Then, if the snooped address is within the range of the Address A through the Address B, the data of the take-over information that is designated by the Address A through the Address B is DMA-transferred. The system control unit 2 controls the memory bus. Therefore, the system control unit 2 can know all the addresses with which the CPU 4 accesses the memory 1, whereby the high-level control can be attained.

It can not, however, be known whether or not a data change (writing) occurs in the data writing operation of the CPU 4 to the memory 1. Such being the case, the judgment as to whether the rewriting to the memory 1 is executed or not involves preparing another memory for the comparison or reading the data from the memory 1 and comparing the data before being written to the memory 1. In this case, there occur an increase in quantity of the hardware and a futile use of the memory bus. Moreover, it is hard in terms of utilization to incorporate these functions into components related to the Chipset showing sharpness in its advancement.

The present invention aims at attaining the high-speed transfer by transferring none of unnecessary data on the basis of the content of the rewriting to the memory without depending on the software and the system resources.

The present invention adopts the following means in order to solve the problems given above. Namely, an information processing device according to the present invention is a single information processing device capable of configuring an information system that maintains matching between information retained by a self device and information retained by a partner device in a way that links up a plurality of information processing devices with each other, the information processing device comprising a storage unit including a memory cell retaining a predetermined quantity of information and a comparing unit that compares the information retained by the memory cell at the present with information written afresh to the memory cell, an extraction unit extracting the information written afresh to the memory cell about which the comparing unit judges that the information retained at the present is different from the information written afresh, and a transmitting unit transmitting the extracted information to the partner device linking up with the self device. According to the information processing device of the present invention, if the information written afresh to the memory cell is different from the information retained by the memory cell at the present, the different information therebetween can be detected. As a result, in the information written afresh to the memory cell, only the different information from the information retained by the memory cell at the present can be transmitted to the partner device.

Further, in the information processing device according to the present invention, the comparing unit, if the information retained by the memory cell is different from the information written afresh to the memory cell, may output a predetermined signal, the extracting unit may extract composite information containing the information written afresh to the memory cell about which the comparing unit judges that the information retained at the present is different from the information written afresh and containing the information written afresh to the memory cell about which the comparing unit judges that the information retained at the present is not different from the information written afresh, the information processing device may further comprise a compression unit compressing the composite information on the basis of the predetermined signal, and the transmitting unit may transmit the compressed composite information to the partner device. According to the information processing device of the present invention, it is possible to further improve transfer efficiency by transmitting the compressed information to the partner device.

Still further, the information processing device according to the present invention may further comprise a receiving unit receiving the compressed composite information transmitted by the partner device, wherein the compression unit may decompress the compressed composite information received by the receiving unit. According to the information processing device of the present invention, the compressed information is received, whereby a larger quantity of information than receiving not-compressed information can be received.

Yet further, a semiconductor storage device according to the present invention is a semiconductor storage device having a plurality of bit lines and a plurality of word lines that are so arranged as to intersect in positions different from each other, and having memory cells disposed at respective intersections thereof, information being written to the memory cell selected by designating both of the bit line and the word line, the semiconductor storage device comprising a comparing unit comparing information retained by the memory cell at the present with information written afresh to the memory cell, wherein the comparing unit, if the information retained by the memory cell at the present is different from the information written afresh to the memory cell, outputs a predetermined signal. According to the semiconductor storage device of the present invention, if the information written afresh to the memory cell is different from the information retained by the memory cell at the present, the different information therebetween can be detected.

Moreover, in the semiconductor storage device according to the present invention, the memory cell may include a capacitance unit retaining a first type of information or a second type of information, of which polarities are different from each other, and a column switch unit controlling a connection of the capacitance unit to the bit line via which to input and output the information, and the comparing unit may include a first change detecting unit outputting a third type of information if the information retained by the capacitance unit is categorized as the first type of information and if the information inputted to the bit line is categorized as the first type of information, outputting a fourth type of information different from the third type of information if the information retained by the capacitance unit is categorized as the first type of information and if the information inputted to the bit line is categorized as the second type of information, and detecting a change from the first type of information to the second type of information, and a second change detecting unit outputting the third type of information if the information retained by the capacitance unit is categorized as the second type of information and if the information inputted to the bit line is categorized as the second type of information, outputting the fourth type of information different from the third type of information if the information retained by the capacitance unit is categorized as the second type of information and if the information inputted to the bit line is categorized as the first type of information, and detecting a change from the second type of information to the first type of information.

Furthermore, the present invention may also be a method by which a computer, other devices, machines, etc execute any one of the processes described above.

According to the present invention, it is possible to attain the high-speed transfer by transferring none of the unnecessary data on the basis of the content of the rewriting to the memory without depending on the software and the system resources.

BRIEF DESCRIPTION OF THE DRAWINGS

FIG. 20 is an explanatory diagram of the writing operation to the buffer unit 8 in the present embodiment.

DETAILED DESCRIPTION OF THE INVENTION

A semiconductor storage device and an information processing device including the semiconductor storage device according to a best mode (which will hereinafter be termed an embodiment) for carrying out the present invention, will hereinafter be described with reference to the drawings. A configuration in the following embodiment is an exemplification, and the present invention is not limited to the configuration in the embodiment.

Figure 1:
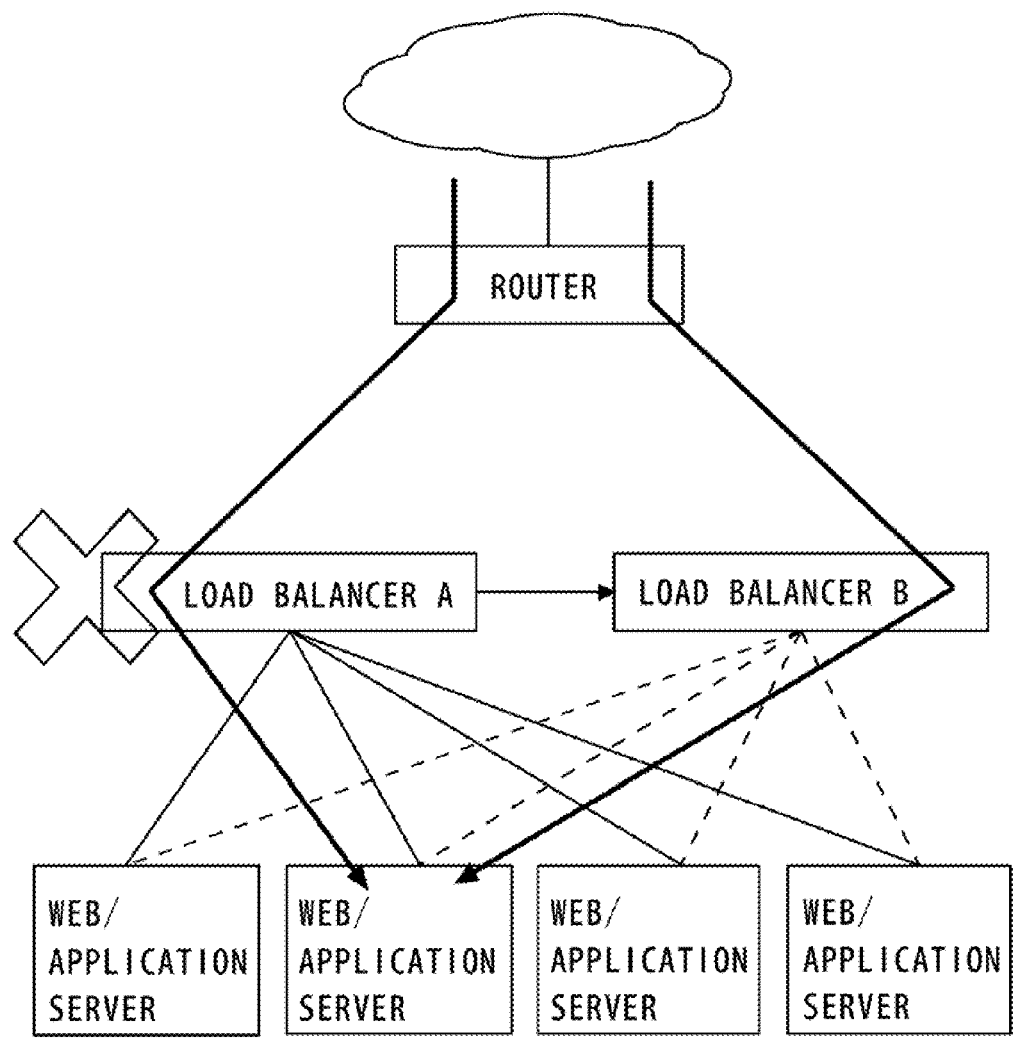
FIG. 1 is a diagram showing a state of how take-over information is transferred between a load balancer A serving as an active device and a load balancer B serving as a standby device.
Figure 2:
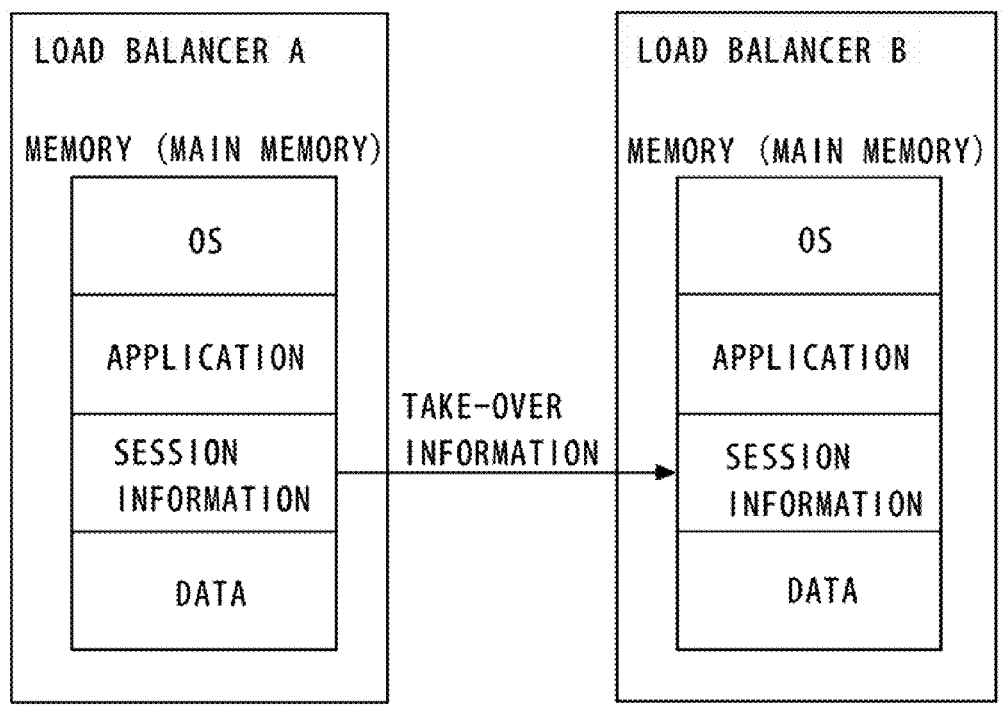
FIG. 2 is a diagram illustrating a state of how session information defined as the take-over information is transferred to the load balancer B from the load balancer A.
Figure 3:
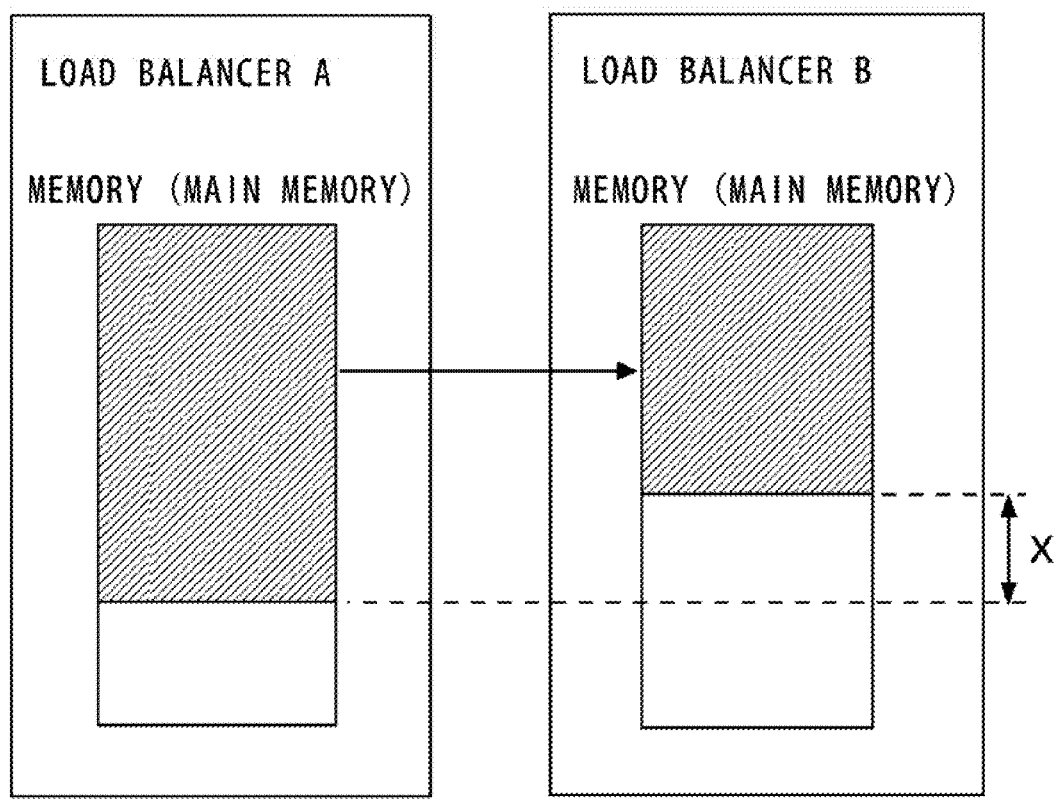
FIG. 3 is a diagram showing a state of how part of the take-over information is transferred to the load balancer B from the load balancer A, while part of the take-over information is not transferred to the load balancer B from the load balancer A.
Figure 4:
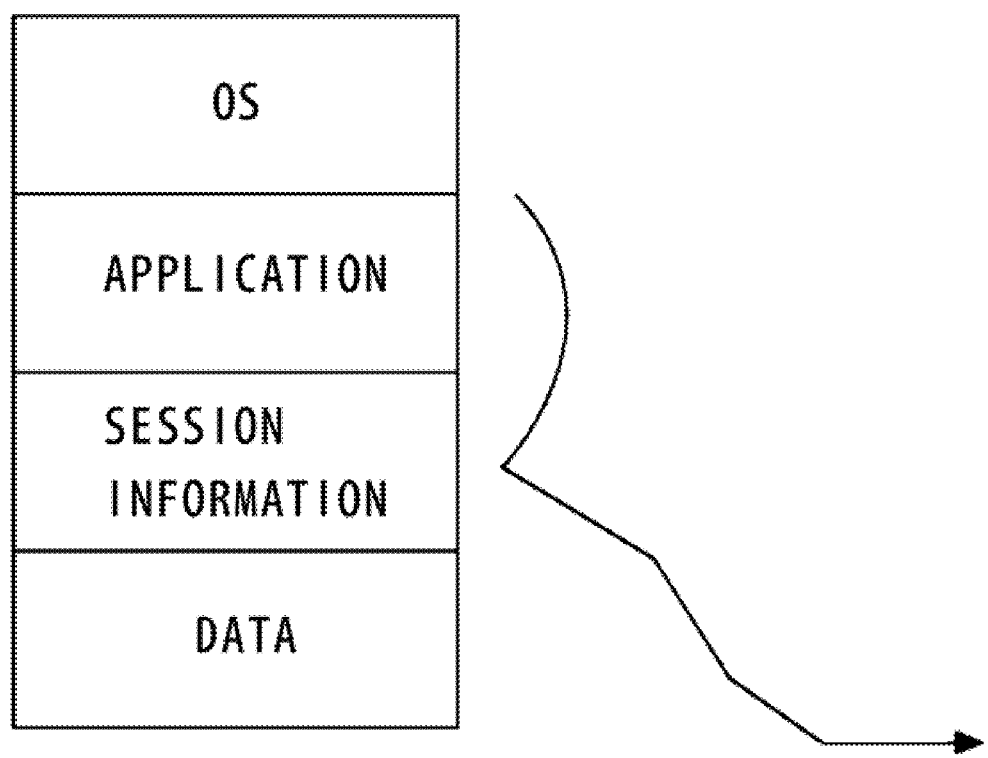
FIG. 4 is an explanatory diagram of a process of taking over the conventional session information.
Figure 5:
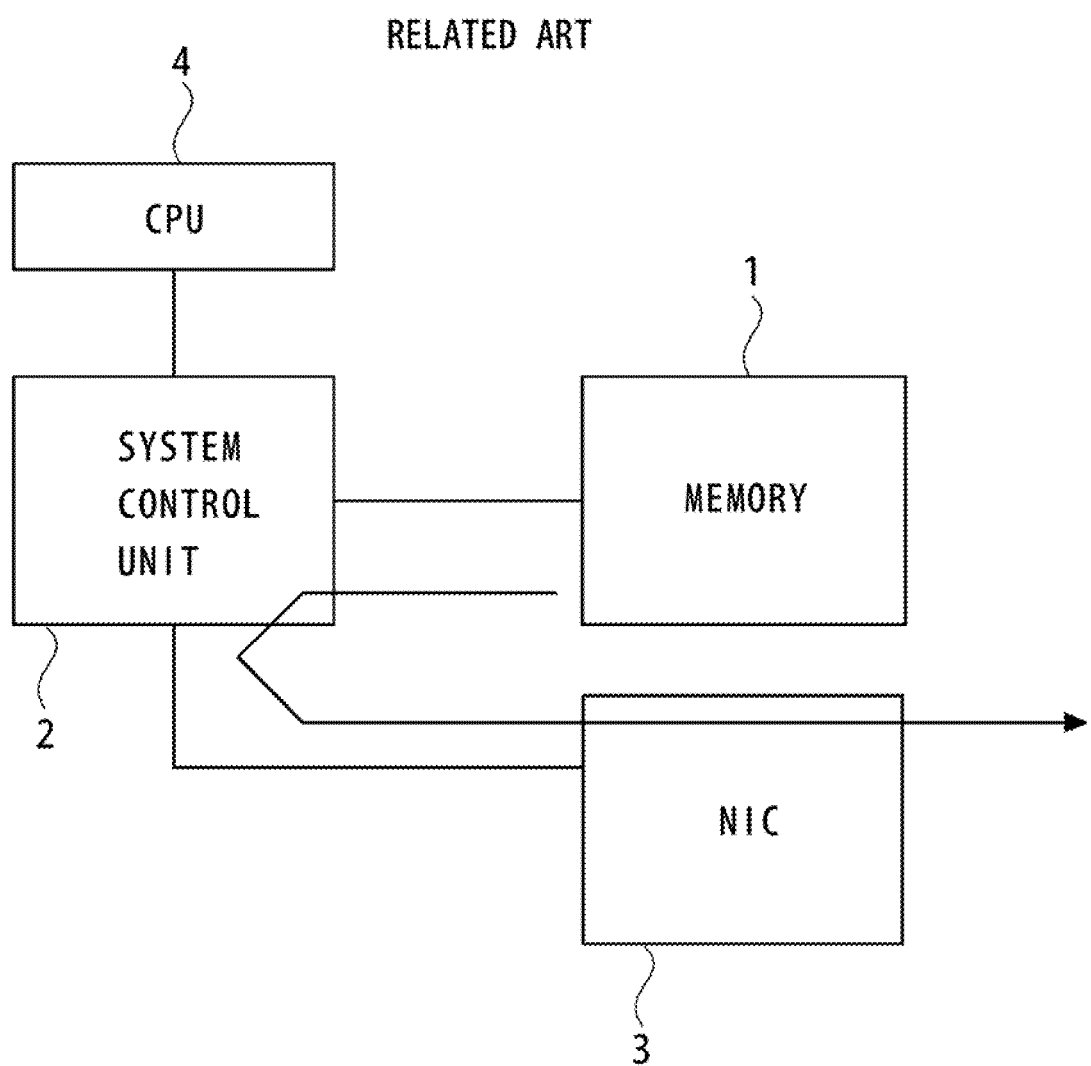
FIG. 5 is a diagram showing a data flow of the conventional take-over information.
Figure 6:
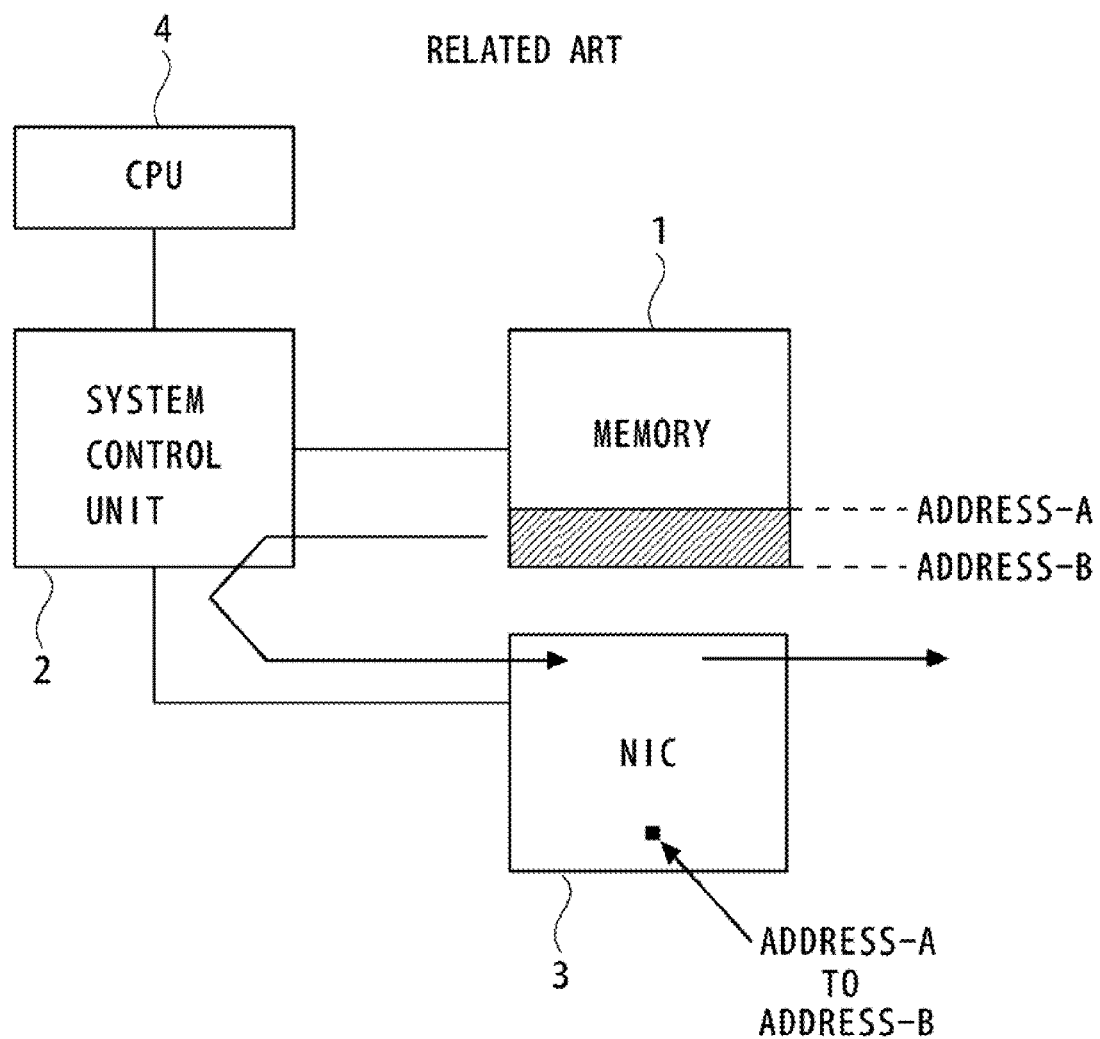
FIG. 6 is a diagram showing a data flow of the take-over information in the case of performing DMA transfer.
Figure 7:
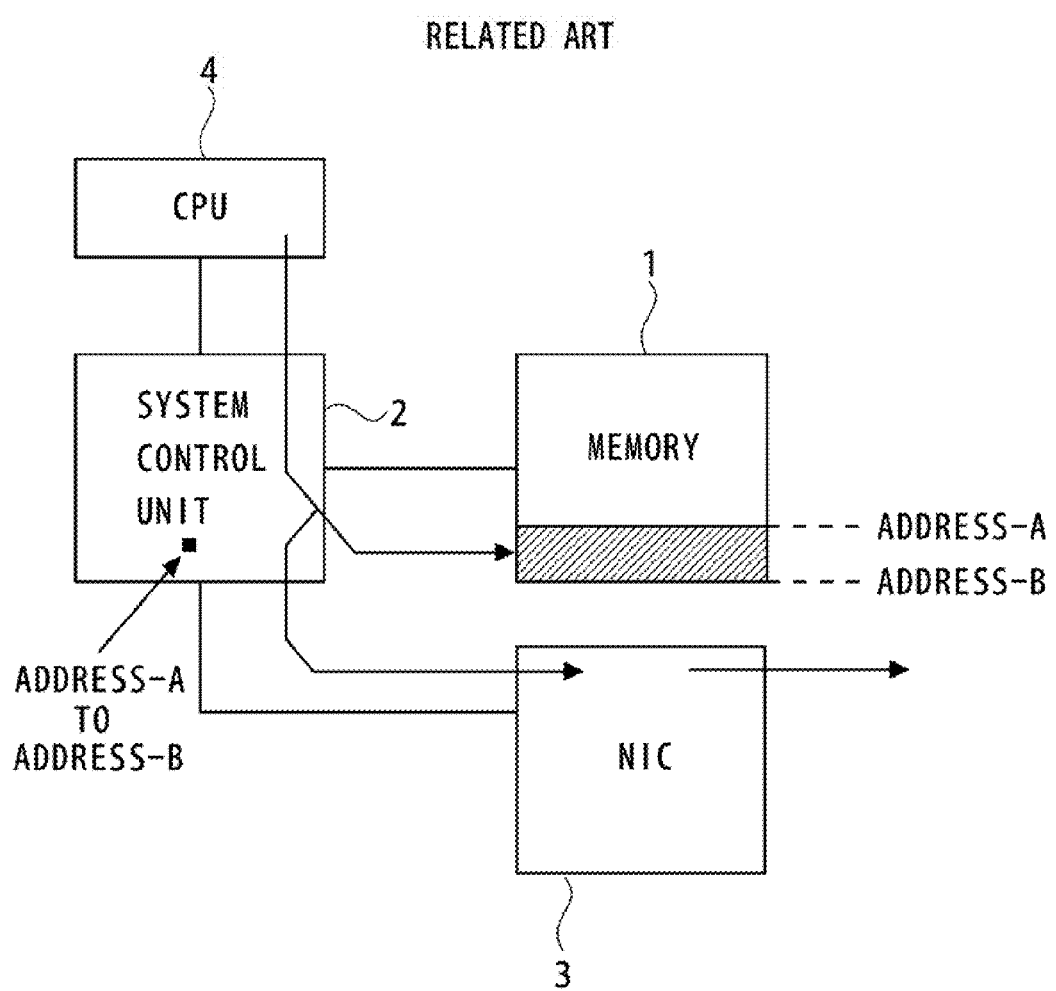
FIG. 7 is a diagram showing a data flow of the take-over information in the case of conducting the DMA transfer by setting a memory range in which data should be transferred to a system control unit.
Figure 8:
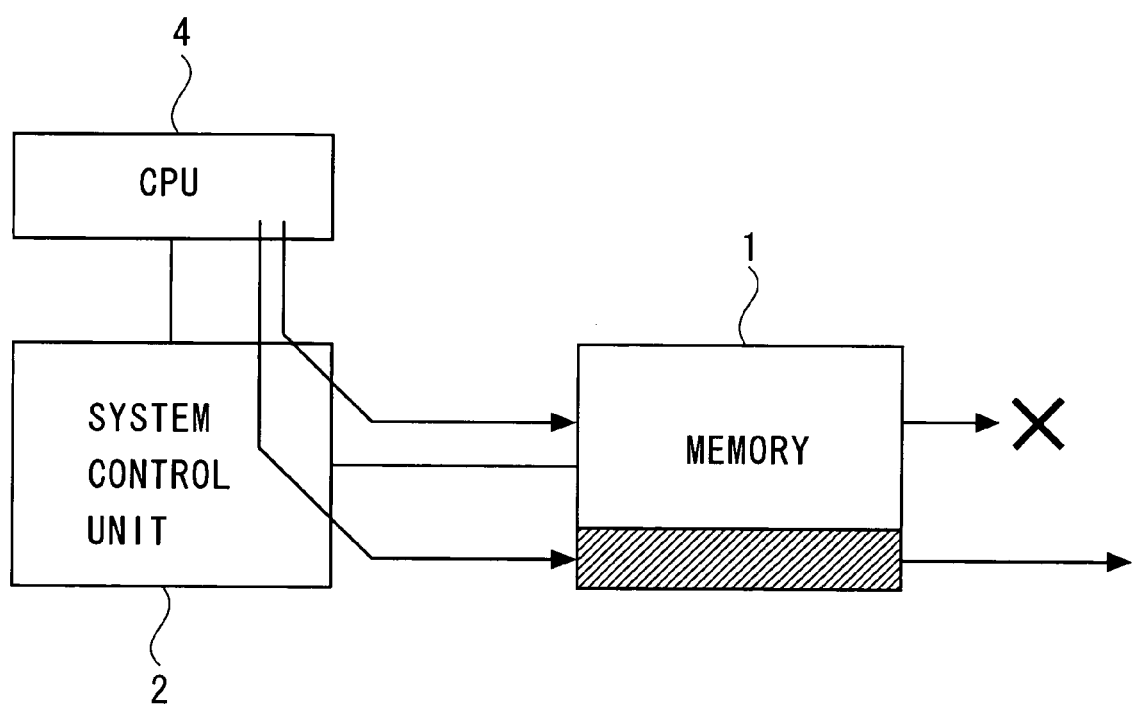
FIG. 8 is a diagram showing an outline of the present embodiment.
Figure 9:
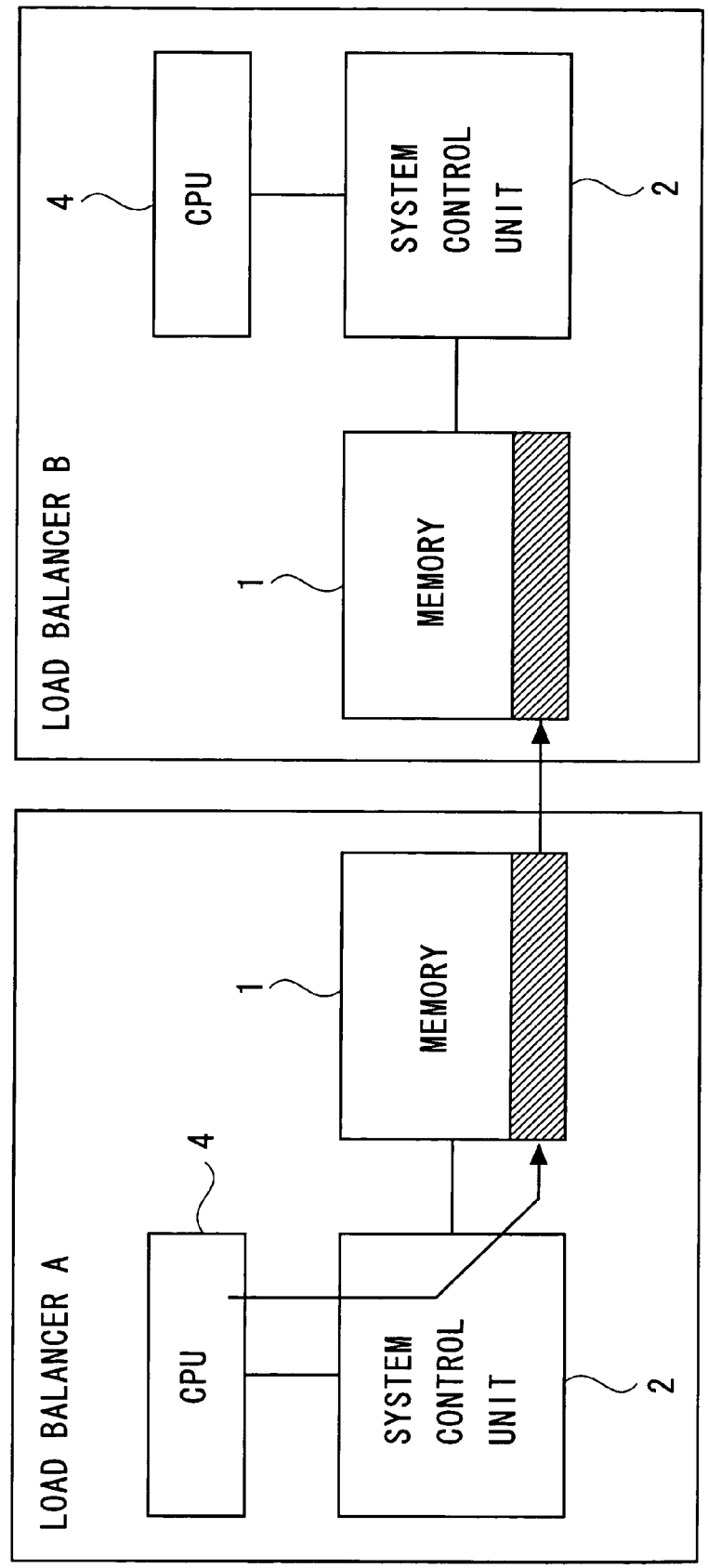
FIG. 9 is a diagram showing a state of how transfer target data undergoes a transfer process to the load balancer B from the load balancer A.

FIG. 8 is a diagram showing an outline of the present embodiment. As illustrated in FIG. 8, with respect to data stored in the memory 1, a transfer target part of data undergoes execution of the transfer process, whereas a transfer non-target part of data undergoes none of the transfer process. FIG. 9 is a diagram illustrating a state of how the load balancer A defined as the active device executes the transfer process of the transfer target partial data to the load balancer B defined as the standby device. If transferring only the transfer target partial data, this enables unnecessary transfer to be reduced and a high-speed transfer process to be executed.

Figure 10:
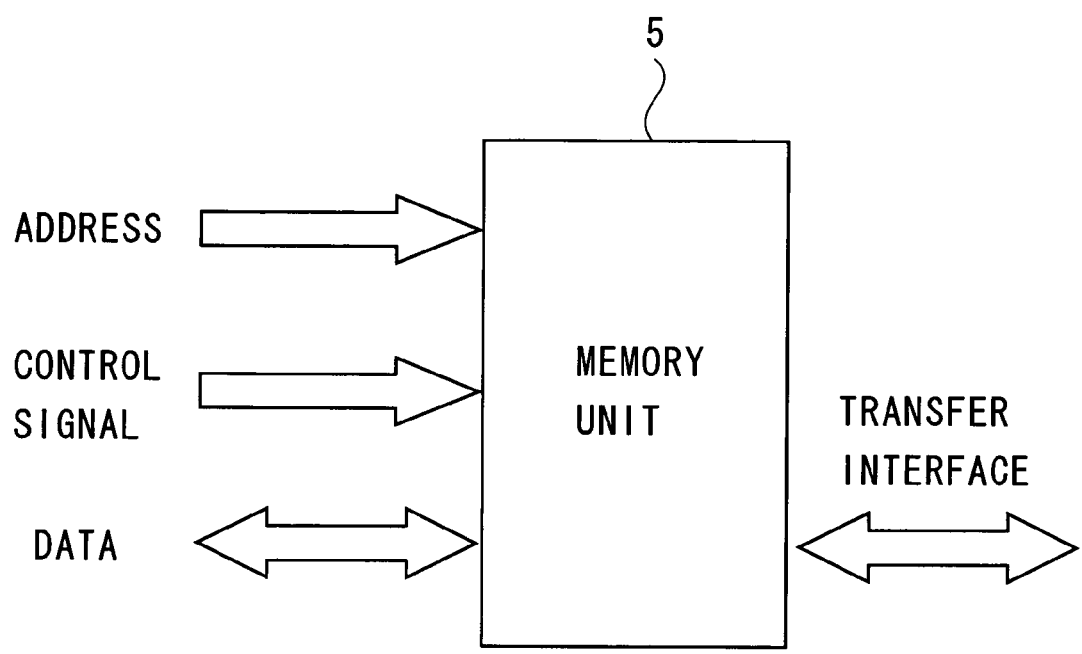
FIG. 10 is a block diagram of a memory unit 5 in the present embodiment.

FIG. 10 is a block diagram of a memory unit 5 in the present embodiment. Connected to the memory unit 5 in the present embodiment are an address line used for designating an address within the memory unit 5, a control signal line for transmitting a control signal from a CPU to the memory unit 5 and a data line employed for transmitting and receiving the data between the CPU and the memory unit 5.

Figure 11:
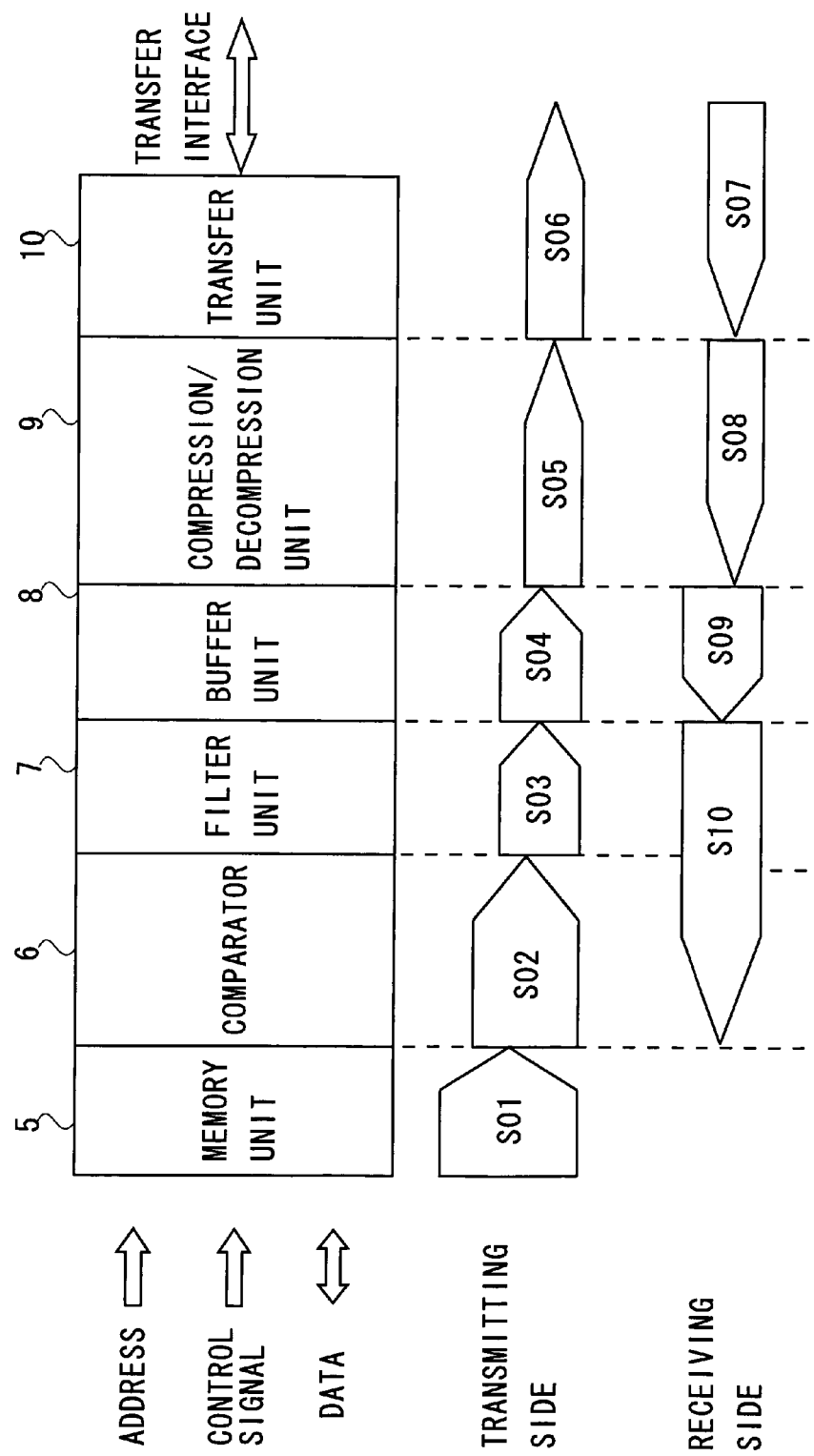
FIG. 11 is a function block diagram of an information processing device in the present embodiment.

FIG. 11 is a function block diagram of the information processing device in the present embodiment.

As illustrated in FIG. 11, the information processing device includes the memory unit 5 that writes and reads the data, a comparator 6 that judges occurrence of writing to the memory unit 5, a filter unit 7 that checks a transfer range, a buffer unit 8 stored with target data, a compression/decompression unit 9 that compresses and decompresses the target data, and a transfer unit 10 transmitting the target data. The information processing device in the present embodiment transmits and receives the data via a transfer interface. Further, the information processing device in the present embodiment may also be configured to incorporate the transfer interface.

Next, an operation of the information processing device in the present embodiment will be explained. To begin with, an operation on the transmitting side, i.e., an operation of the active device A including the information processing device in the present embodiment, will be described. The CPU provided in the active device A executes writing to the memory unit 5 (S01). The comparator 6 judges whether or not there is a change between the write data and original data before being written (S02).

The filter unit 7 judges whether the write data is transfer target data or not (S03). To be specific, the filter unit 7 judges whether or not the write data is written to a predetermined address of the memory unit 5. Then, the filter unit 7 sets, as the transfer target data, the data written to the predetermined address of the memory unit 5. Further, the filter unit 7 judges whether or not the write data is the same as the data written to the memory unit 5. Then, if the write data is the same as the data written to the memory unit 5, the filter unit 7 excludes, from the transfer target data, the data that is the same as the data written to the memory unit 5.

The filter unit 7 stores only the transfer target data in the buffer unit 8 (S04). The compression/decompression unit 9 compresses the data stored in the buffer unit 8 (S05). The transfer unit 10 transmits the compressed data via the transfer interface (S06).

Given next is an explanation of an operation of the receiving side, i.e., an operation of the standby device B including the information processing device in the present embodiment. The transfer unit 10 receives the compressed data via the transfer interface (S07). The compression/decompression unit 9 decompresses the compressed data (S08). The compression/decompression unit 9 stores the decompressed data in the buffer unit 8 (S09). The filter unit 7 writes the data stored in the buffer unit 8 to the memory unit 5 (S10).

Figure 12:
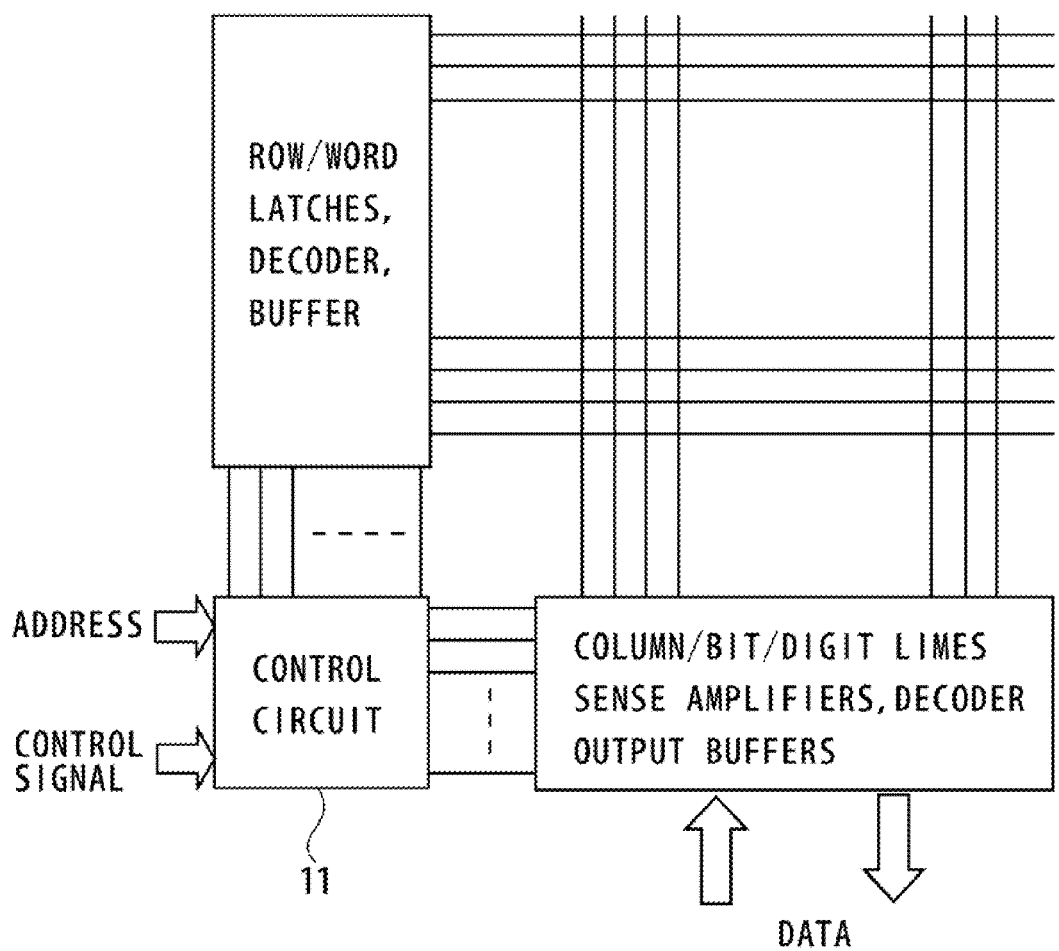
FIG. 12 is a diagram showing an example of a general type of DRAM.

FIG. 12 is a diagram showing an example of a general type of DRAM (Dynamic Random Access Memory). As illustrated in FIG. 12, an address is inputted via an address line to a control circuit 11, and a control signal is inputted via a signal line to the control circuit 11. Further, as shown in FIG. 12, the data is inputted and outputted via data lines.

Figure 13:
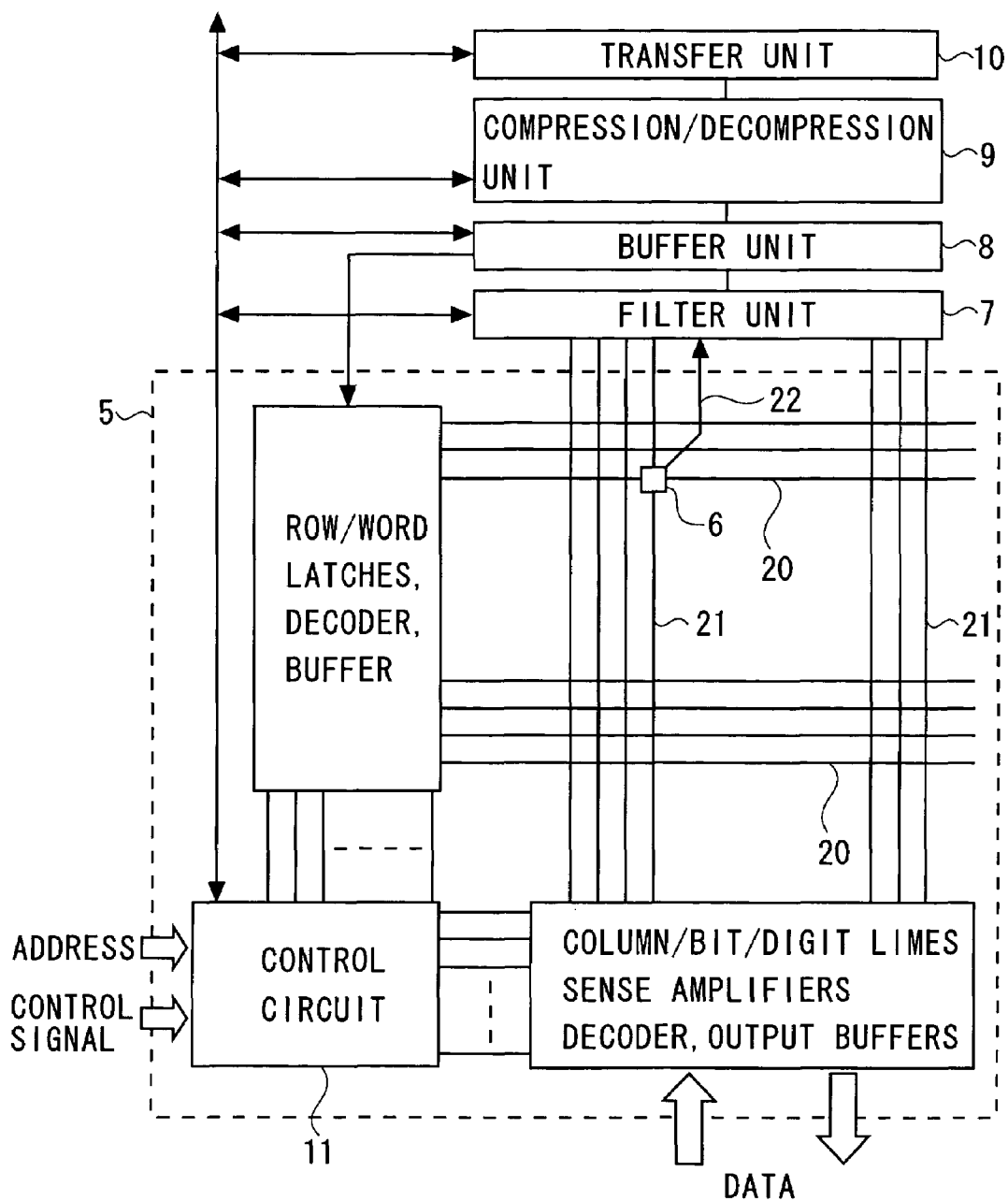
FIG. 13 is a diagram of a configuration of an information processing device in the present embodiment.

FIG. 13 is a diagram of a configuration of the information processing device in the present embodiment. As shown in FIG. 13, the information processing device in the present embodiment is constructed of the memory unit 5, the filter unit 7, the buffer unit 8, the compression/decompression unit 9 and the transfer unit 10.

The memory unit 5 defined as the semiconductor storage device is constructed of the comparators 6, the control circuit 11, word lines 20, bit lines 21 and change lines 22. As illustrated in FIG. 13, wiring is arranged in such a way that the word lines 20 and the bit lines 21 intersect each other. Then, the comparators 6 are provided at the intersections between the word lines 20 and the bit lines 21. The change line 22 is provided between the comparator 6 and the filter unit 7. The filter unit 7, the buffer unit 8, the compression/decompression unit 9 and the transfer unit 10 are connected via a bus to the control circuit 11. Moreover, though not illustrated in FIG. 13, the comparators 6 and the change lines 22 are provided at the intersections between all the word lines 20 and all the bit lines 21.

Figure 14:
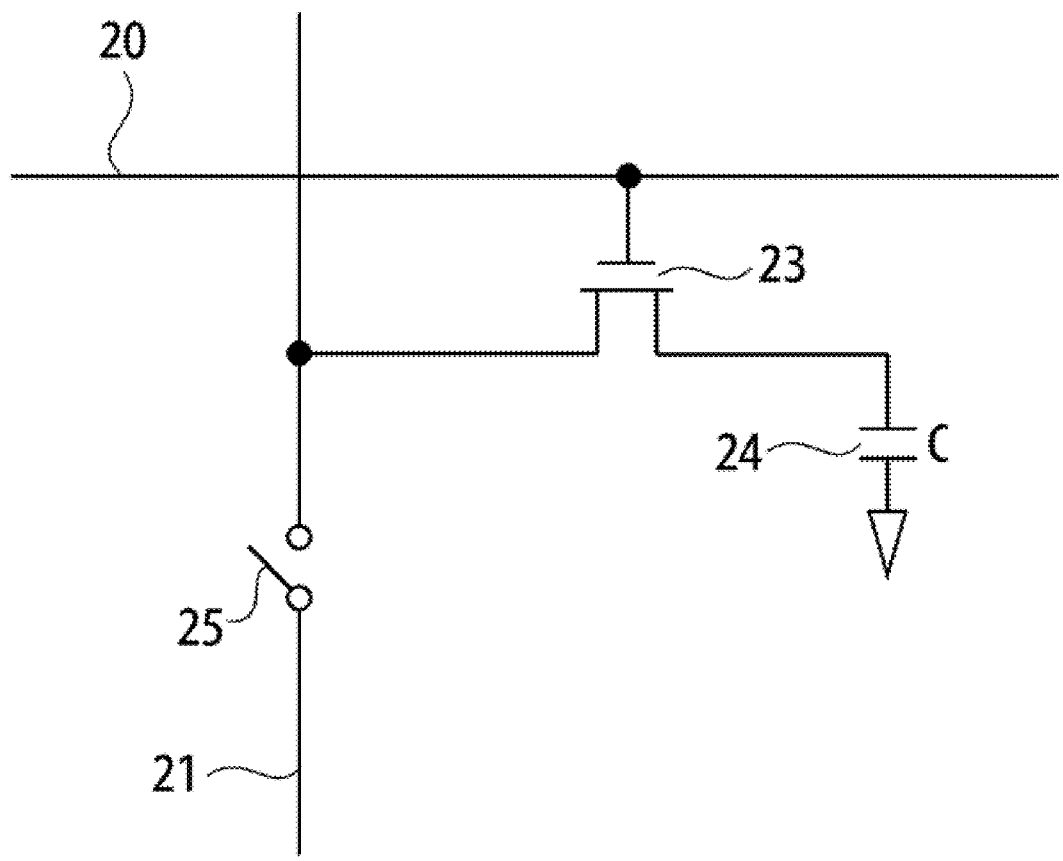
FIG. 14 is a diagram of a structure of a memory cell of the general type of DRAM.

FIG. 14 is a diagram of a configuration of a memory cell of the general type of DRAM. As shown in FIG. 14, the wiring is arranged, wherein the word lines 20 and the bit lines 21 intersect each other. Further, a transistor 23 is connected to the word line 20. A source electrode or a drain electrode of the transistor 23 is connected to a capacitor 24. Moreover, the source electrode or the drain electrode of the transistor 23 is connected to the bit line 21. The capacitor 24 is grounded. The bit line 21 is provided with a column switch 25. Furthermore, illustrations of a sense amplifier unit and a precharge unit are omitted from FIG. 14.

Figure 15:
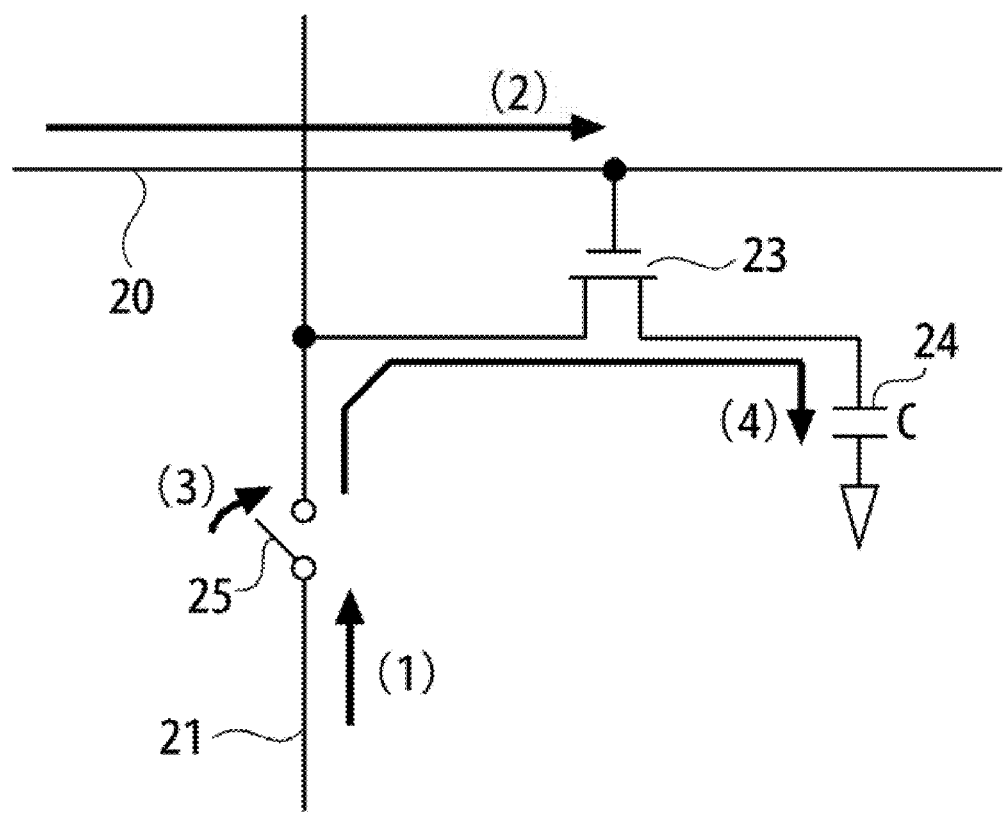
FIG. 15 is an explanatory diagram of a writing operation to the memory cell of the general type of DRAM.

FIG. 15 is an explanatory diagram of the writing operation to the memory cell of the general type of DRAM. Given at first is an explanation of the operation in the case of storing a piece of information such as "1" in the memory cell. The write data is carried on the bit line 21 (1). Namely, the bit line 21 is driven at a high signal level.

Next, the word line 20 is driven (2). Namely, the word line 20 is driven at the high signal level. In the case of driving the word line 20 at the high signal level, a high voltage is applied to the transistor 23. When the high voltage is applied to the transistor 23, an electric current flows between the source electrode and the drain electrode of the transistor 23.

Then, the column switch 25 is closed (3). As a result, the data on the bit line 21 is stored in the capacitor 24 (4). Namely, an electric charge corresponding to the write data "1" is accumulated in the capacitor 24.

Next, an operation in the case of writing a piece of information "0" to the memory cell will be described. To start with, the write data is carried on the bit line 21 (1). Namely, the bit line 21 is driven at a low signal level. Next, the word line 20 is driven (2). Namely, the word line 20 is driven at the high signal level. In the case of driving the word line 20 at the high signal level, the high voltage is applied to the transistor 23. When the high voltage is applied to the transistor 23, the electric current flows between the source electrode and the drain electrode of the transistor 23.

Then, the column switch 25 is closed (3). If the electric charge corresponding to the write data "1" has been accumulated in the capacitor 24, the electric charge of the capacitor 24 is discharged. As a result, the information "0" is written to the memory cell. Further, if the information "0" has already been written to the memory cell, the electric charge in the capacitor 24 is not discharged. Namely, the information "0" written to the memory cell remains unchanged.

Figure 16:
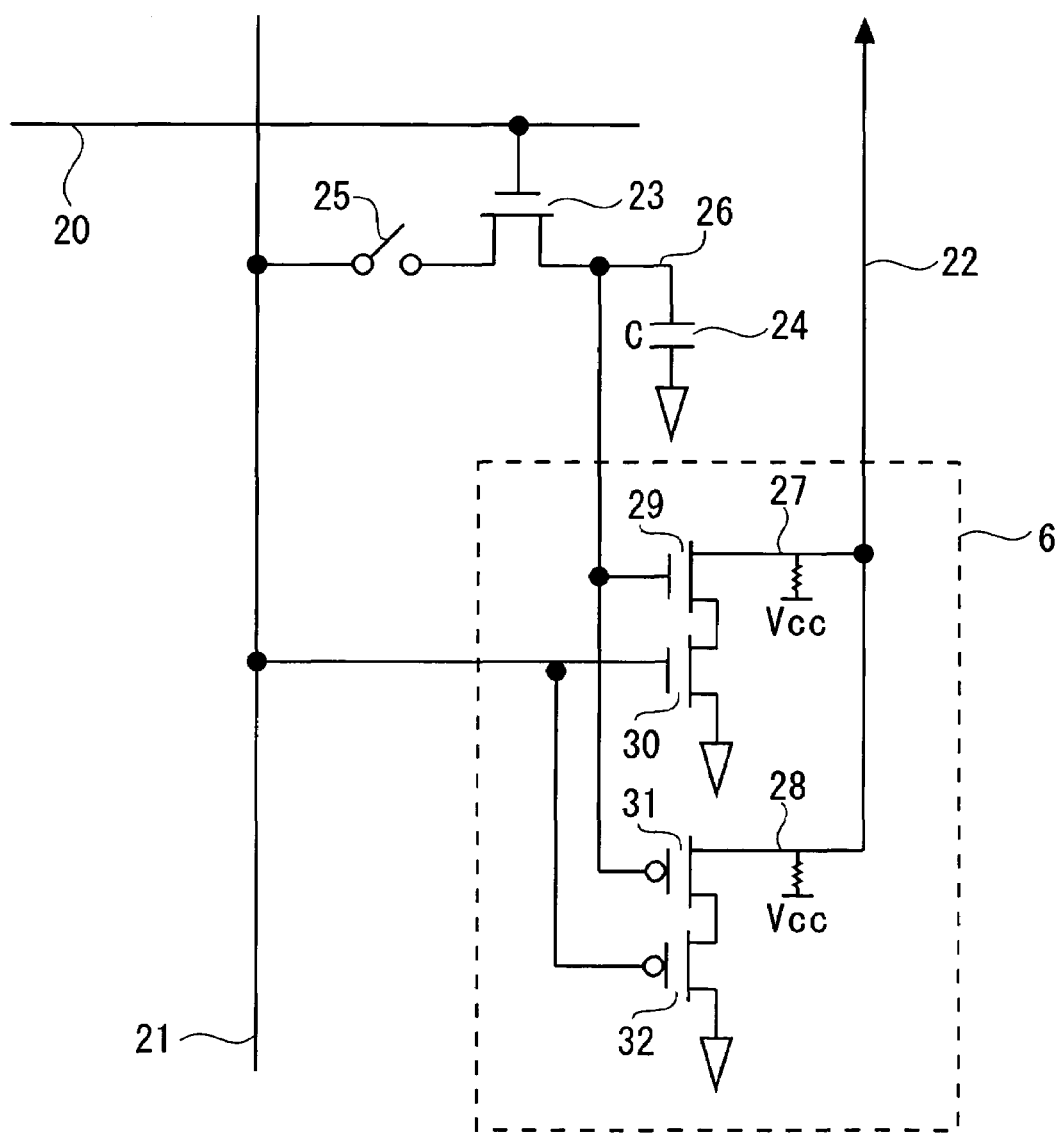
FIG. 16 is a diagram of a structure of a memory cell in the present embodiment.

FIG. 16 is a diagram of the configuration of the memory cell in the present embodiment. As shown in FIG. 16, the wiring is arranged in such a way that the word lines 20 and the bit lines 21 intersect each other. The transistor 23 is connected to the word line 20. The transistor 23 can involve using, e.g., an nMOS transistor.

The capacitor 24 is connected to the transistor 23. Further, the transistor 23 is connected to the bit line 21. The capacitor 24 is grounded. The column switch 25 is provided between the bit line 21 and the transistor 23. As illustrated in FIG. 16, the memory cell in the present embodiment is provided with the comparator 6. The comparator 6 is connected to the bit line 21. Moreover, the comparator 6 is connected to a signal line 26 that connects the transistor 23 and the capacitor 24 to each other.

As shown in FIG. 16, the comparator 6 is constructed of a transistor 29, a transistor 30, a transistor 31 and a transistor 32. The transistor 29 and the transistor 30 can involve employing, e.g., the nMOS transistors. The transistor 31 and the transistor 32 can involve using, e.g., pMOS transistors. Further, FIG. 16 omits illustrations of the sense amplifier unit and the precharge unit.

The transistor 29 and the transistor 31 are connected to the change line 22. The transistor 30 and the transistor 32 are connected to the bit line 21. A power source (Vcc) is connected via a resistance to a signal line 27 that connects the transistor 29 and the change line 22 to each other. Moreover, a power source (Vcc) is connected via a resistance to a signal line 28 that connects the transistor 31 and the change line 22 to each other. Therefore, when any one of the transistor 29 and the transistor 30 is OFF and when any one of the transistor 31 and the transistor 32 is OFF, the change line 22 is pulled up to "high".

Further, the transistor 29 and the transistor 30 are connected to each other. Still further, the transistor is grounded.

The transistor 31 is connected to the change line 22. Yet further, the transistor 31 and the transistor 32 are connected to each other. Moreover, the transistor 32 is grounded.

The comparator 6 compares the data stored in the capacitor 24 with the data outputted to the bit line 21. The comparator 6, if the data stored in the capacitor 24 is coincident with the data outputted to the bit line 21, outputs a signal to the change line 22.

When the high voltage is applied to a gate electrode of the transistor 29, a conductive state occurs between the source electrode and the drain electrode of the transistor 29. When the high voltage is applied to the gate electrode of the transistor 30, the conductive state occurs between the source electrode and the drain electrode of the transistor 30. When the high voltage is applied to the gate electrode of the transistor 29 and when the high voltage is applied to the gate electrode of the transistor 30, the change line 22 comes to a state of being grounded. Namely, the change line 22 becomes "low" via the transistor 29 and the transistor 30.

When the high voltage is applied to the gate electrode of the transistor 29 and when the low voltage is applied to the gate electrode of the transistor 30, the change line 22 does not come to the state of being grounded. Further, when the low voltage is applied to the gate electrode of the transistor 29 and when the high voltage is applied to the gate electrode of the transistor 30, the change line 22 does not get into the grounded state.

When the low voltage is applied to the gate electrode of the transistor 31, the conductive state occurs between the source electrode and the drain electrode of the transistor 31. When the low voltage is applied to the gate electrode of the transistor 32, the conductive state occurs between the source electrode and the drain electrode of the transistor 32. When the low voltage is applied to the gate electrode of the transistor 31 and when the low voltage is applied to the gate electrode of the transistor 32, the change line 22 comes to the grounded state. Namely, the change line 22 becomes "low" via the transistor 31 and the transistor 32.

When the high voltage is applied to the gate electrode of the transistor 31 and when the low voltage is applied to the gate electrode of the transistor 32, the change line 22 does not come to the grounded state. Moreover, when the low voltage is applied to the gate electrode of the transistor 31 and when the high voltage is applied to the gate electrode of the transistor 32, the change line 22 does not get into the grounded state.

The comparator 6 in the present embodiment compares the data written to the memory cell with the write data to the memory cell. Then, the comparator 6, if the data written to the memory cell is not coincident with the write data to the memory cell, flows the low current to the change line 22. As a result, the filter unit 7 connected to the change line 22 can recognize as to whether the data written to the memory cell is coincident with the write data or not.

The memory unit 5 in the present embodiment is provided with the plurality of bit lines 21, and therefore the comparator 6 shown in FIG. 16 is provided on each of the bit lines 21. Namely, the configuration is that all the memory cells arrayed in the memory unit 5 are provided with the comparators 6.

Figure 17:
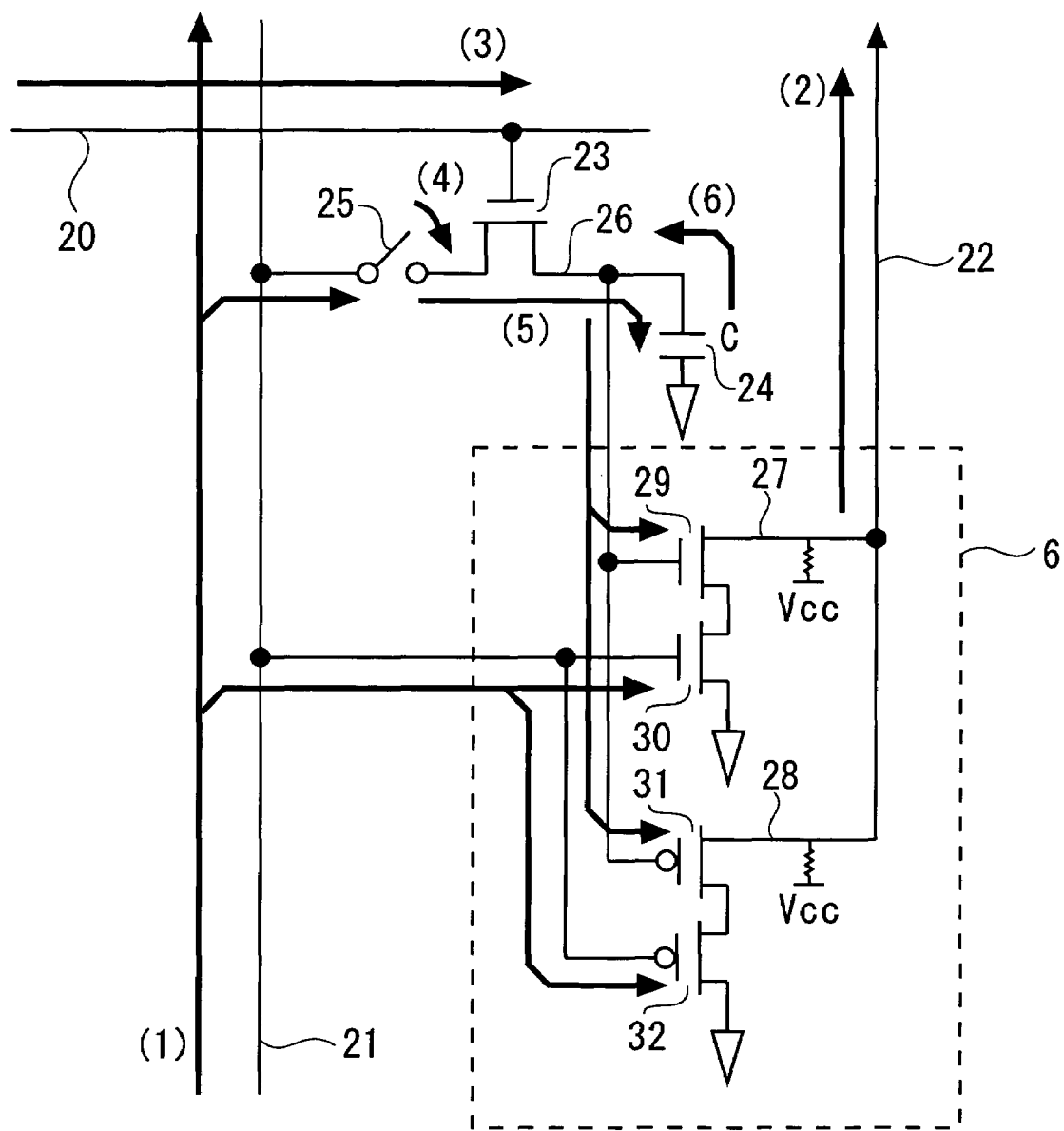
FIG. 17 is an explanatory diagram of a writing operation to the memory cell in the present embodiment.

FIG. 17 is an explanatory diagram showing the writing operation to the memory cell in the present embodiment. To begin with, the operation of storing the data "1" in the memory cell will be explained. The write data is outputted to the bit line 21 (1). Namely, the bit line 21 is driven at the high signal level. As shown in FIG. 17, in the memory cell according to the present embodiment, the column switch 25 is provided between the bit line 21 and the transistor 23. Accordingly, the write data is propagated to the bit line 21 throughout and is transferred also to the comparator 6 in the memory cell. When the bit line 21 is driven at the high signal level, the high voltage is applied to the transistor 30 and the transistor 32.

Moreover, the information stored in the capacitor 24 is always transferred to the comparator 6. In this case, the high or low voltage is applied to the transistor 29 and to the transistor 31, corresponding to the electric charge accumulated in the capacitor 24. If the data "1" has already been stored in the memory cell, the high voltage is applied to the transistor 29 and the transistor 31. If the data "0" has already been stored in the memory cell, the low voltage is applied to the transistor 29 and the transistor 31.

When the data stored in the memory cell and the data outputted to the bit line 21 are transferred to the comparator 6, the comparator 6 outputs a result of the comparison between the data stored in the memory cell and the data outputted to the bit line 21 at the change line 22 (2).

Next, the word line 20 is driven (3). To be specific, the word line 20 is driven at the high signal level. When the word line 20 is driven at the high signal level, the high voltage is applied to the transistor 23. When the high voltage is applied to the transistor 23, the current flows between the source electrode and the drain electrode of the transistor 23.

Then, the column switch 25 is closed (4). As a result, the data on the bit line 21 is stored in the capacitor 24 (5). Namely, the electric charge corresponding to the write data "1" is accumulated in the capacitor 24. In this case, when the electric charge corresponding to the write data "1" is accumulated in the capacitor 24, the electric charge accumulated in the capacitor 24 remains unchanged. Namely, no change occurs in the data "1" written to the memory cell.

Given next is an explanation of the operation in the case of storing the data "0" in the memory cell. To begin with, the write data is outputted to the bit line 21 (1). Specifically, the bit line 21 is driven at the low signal level. In this case, the write data is propagated to the bit line 21 throughout and is transferred also to the comparator 6 within the memory cell. When the bit line 21 is driven at the low signal level, the low voltage is applied to the transistor 30 and the transistor 32.

Further, the information stored in the capacitor 24 is always transferred to the comparator 6. In this case, the high or low voltage is applied to the transistor 29 and to the transistor 31, corresponding to the electric charge accumulated in the capacitor 24. If the data "1" has already been stored in the memory cell, the high voltage is applied to the transistor 29 and the transistor 31. If the data "0" has already been stored in the memory cell, the low voltage is applied to the transistor 29 and the transistor 31.

When the data stored in the memory cell and the data outputted to the bit line 21 are transferred to the comparator 6, the comparator 6 outputs a result of the comparison between the data stored in the memory cell and the data outputted to the bit line 21 at the change line 22 (2).

Next, the word line 20 is driven (3). To be specific, the word line 20 is driven at the high signal level. When the word line 20 is driven at the high signal level, the high voltage is applied to the transistor 23. When the high voltage is applied to the transistor 23, the current flows between the source electrode and the drain electrode of the transistor 23.

Then, the column switch 25 is closed (4). When the electric charge corresponding to the write data "1" has been accumulated in the capacitor 24, the electric charge in the capacitor 24 is discharged (6). As a result, the data "0" is written to the memory cell. Further, if the data "0" has already been written to the memory cell, the discharge of the electric charge in the capacitor 24 does not occur. Namely, there is no change in the data "0" written to the memory cell.

From the above, the memory unit 5 in the present embodiment can compare the data written to the memory cell with the write data to the memory cell. Further, the memory unit 5 in the present embodiment, if the data written to the memory cell is not coincident with the write data to the memory cell, outputs the predetermined signal. As a result, this enables the filter unit 7 to recognize that the data written to the memory cell is not coincident with the write data to the memory cell.

Figure 18:
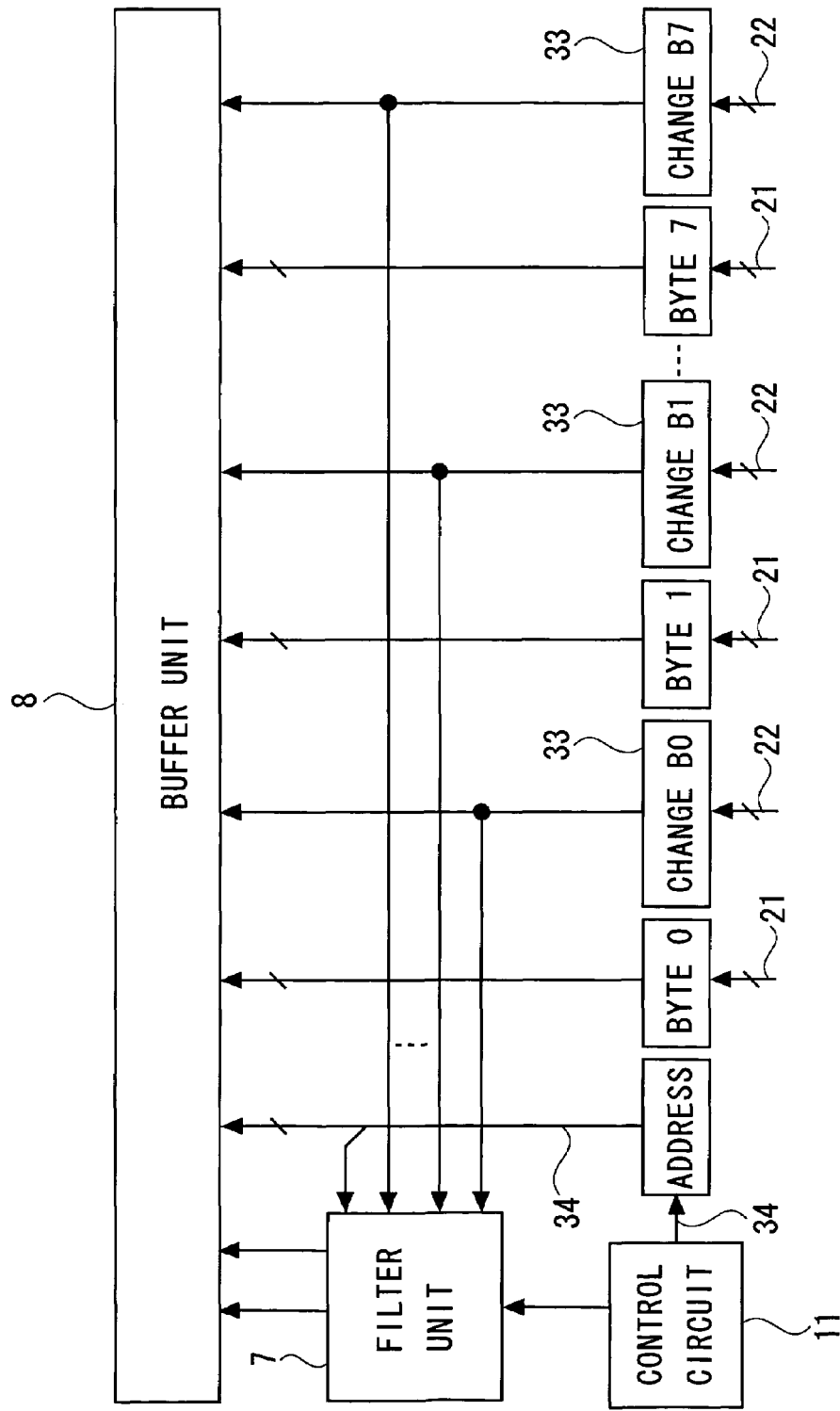
FIG. 18 is an explanatory diagram of a filter unit 7 and a buffer unit 8.

Moreover, the memory unit 5 in the present embodiment can, before the write data is written to the memory cell, detect whether the data written to the memory cell is coincident with the write data to the memory cell or not. FIG. 18 is an explanatory diagram of the filter unit 7 and the buffer unit 8. The bit lines 21 and the change lines 22 illustrated in FIGS. 16 and 17 are all aggregated. As shown in FIG. 18, the bit lines 21 illustrated in FIGS. 16 and 17 are aggregated by plural lines and thus connected to the buffer unit 8. Further, as shown in FIG. 18, the change lines 22 illustrated in FIGS. 16 and 17 are aggregated by plural lines and thus connected to the filter unit 7 and to the buffer unit 8 via change circuits 33.

The change circuit 33 shown in FIG. 18 is an OR circuit. Accordingly, if the low current flows to all the change lines 22 aggregated by the plural lines, the data "0" is inputted to the filter unit 7 and to the buffer unit 8 via the change circuits 33. On the other hand, if the high current flows to at least one of the change lines 22 aggregated by the plural lines, the data "1" is inputted to the filter unit 7 and to the buffer unit 8 via the change circuits 33. In the present embodiment, the change lines 22 are aggregated on an 8-line-by-8-line basis and thus connected to the filter unit 7 and to the buffer unit 8 via the change circuits 33. Therefore, it is possible to detect whether rewriting is done or not for every 8-bit data. The present embodiment is, however, an exemplification, and the number of lines, by which the change lines 22 are aggregated, is changeable.

"Address" is inputted to the filter unit 7 and to the buffer unit 8 from the control circuit 11 via a signal line 34 shown in FIG. 18. The "Address" is an address assigned to the memory unit 5. The "Address" is assigned a value different for every 8 bytes. Therefore, the write data is controlled on a byte-by-byte basis (byte unit). The present embodiment takes the byte unit as the unit for managing a change, wherein a word consists of 8 bytes.

An operation of the filter unit 7 will be explained. The filter unit 7 checks whether the write data is transfer target data or not. The check as to whether the write data is the transfer target data or not, is conducted on the basis of designation of an address range, on a page-by-page basis and so forth.

Moreover, the filter unit 7, if no change occurs at all, excludes the write data out of the transfer target data even when performing the writing operation to the memory unit 5. Specifically, the filter unit 7 monitors the writing operation to the memory unit 5, and, if the same data is written to the memory unit 5, excludes the write data from the transfer target data. For instance, if the memory unit 5 is stored with the data such as "00000000", this data "00000000" written to the memory unit 5 is excluded from the transfer target data.

The filter unit 7, if the data written to the memory unit 5 is the transfer target data, writes the transfer target data to the buffer unit 8. The filter unit 7 controls, in addition, the whole of the buffer unit 8 (such as making adjustments with respect to the reading side units). In the present embodiment, the buffer unit 8 can involve using, e.g., a dual-port SRAM.

Figure 19:
FIG. 19 is a chart showing a using example of the buffer unit 8.

FIG. 19 is a chart showing a using example of the buffer unit 8. As shown in FIG. 19, the buffer unit 8 has fields such as Address, Byte Mark, Byte 0, Byte 1, Byte 2, Byte 3, Byte 4, Byte 5, Byte 6 and Byte 7.

The Byte Mark is defined as a flag showing whether original data is rewritten or not. The original data represents the data stored in the memory unit 5 before the write data is written to the memory cell.

The Byte Mark field consists of 8 bits. A head part (corresponding to a value of 0 in the Byte Mark field shown in FIG. 19) of the Byte Mark field is stored with "0" or "1" outputted from the Change B0 circuit shown in FIG. 18. A second part (corresponding to a value of 1 in the Byte Mark field shown in FIG. 19) of the Byte Mark field is stored with "0" or "1" outputted from the Change B1 circuit shown in FIG. 18. Third through seventh parts (corresponding to values of 2 through 6 in the Byte Mark field shown in FIG. 19) of the Byte Mark field are sequentially stored with "0" or "1" outputted from the Change B2 circuit, the Change B3 circuit, the Change B4 circuit, the Change B5 circuit and the Change B6 circuit, of which illustrations are omitted in FIG. 18. An eighth part (corresponding to a value of 7 in the Byte Mark field shown in FIG. 19) of the Byte Mark field is stored with "0" or "1" outputted from the Change B7 circuit shown in FIG. 18.

Thus, the Byte Mark field is stored with the value of "0" or "1" outputted from the Change B0 circuit through the Change B7 circuit shown in FIG. 18.

The write data is stored in each of the Byte 0 field through the Byte 7 field. The Byte 0 through the Byte 7 in FIG. 18 correspond to the Byte0 field through the Byte 7 field in FIG. 19.

The writing operation to the buffer unit 8 in the present embodiment will be explained with reference to FIG. 20. The writing operation to the buffer unit 8 is executed by the filter unit 7.

For example, it is set in the control circuit 11 that the data in Address F through Address L of the memory unit 5 become transfer target information. In this case, pieces of transfer target information in the Address F through the Address L are transferred to the filter unit 7 from the control circuit 11. Further, it may also be set in the filter unit 7 that the data in the Address F through the Address L of the memory unit 5 become the transfer target information.

In the case of writing the data to the memory unit 5, the CPU writes the data in the sequence of Addresses A, B, C, . . . L, X, Y, Z to the memory unit 5. The Addresses A, B, C are excluded from the transfer targets. Therefore, with respect to the write data to the Addresses A, B, C, the filter unit 7 does not store these pieces of write data in the buffer unit 8. Addresses F, F+1, F+2, . . . L-2, L-1, L are the transfer targets. Hence, the filter unit 7 compares the original data with the write data.

In the present embodiment, the change lines 22 are aggregated by eight lines, and the data are inputted to the filter unit 7 via the change circuits 33. Accordingly, the comparison between the original data and the write data is carried out for every 8 bits in binary number.

As illustrated in FIG. 20, the original data in the Address F is "89DE67AA9078FEDC", and the write data is "CCEF56781290ACDE". The head data "8" of the original data of the Address F is 4-bit data in binary number. Further, the second data "9" from the left of the original data of the Address F is 4-bit data in binary number. Accordingly, the filter unit 7 performs the comparison between the write data and the original data of the Address F on the 8-bit basis such as "89", "DE", "67", "AA", "90", "78", "FE", "DC".

The original data of the Address F and the write data of the Address F are rewritten in every part (every 4-bit value). Since the Address F is the transfer target, the filter unit 7 stores "F" in the Address field of the buffer unit 8 and stores "11111111" in the Byte Mark field. Further, the Address F is the transfer target, and hence the filter unit 7 stores the write data "CCEF56781290ACDE" in a Data field of the buffer unit 8.

Moreover, as shown in FIG. 20, the original data of the Address F+1 is "990087DEEF332190", while the write data of the Address F+1 is "99AC87DEEF332190". The original data of the Address F+1 and the write data of the Address F+1 are rewritten with respect to the third value "A" and the fourth value "C" from the left of the original data of the Address F+1. Therefore, the filter unit 7 stores a value (8-bit) "01000000" in the Byte Mark field of the buffer unit 8. Then, the Address F+1 is the transfer target, and hence the filter unit 7 stores the write data "99AC87DEEF332190" in the Data field of the buffer unit 8.

Furthermore, as shown in FIG. 20, the original data of the Address L is "0000000000000800", and the write data of the Address L is also "0000000000000800". There is no rewritten value both in the original data of the Address L and in the write data of the Address L. Namely, the same data as the original data is written as the write data. In this case, the filter unit 7 excludes the write data of the Address L from the transfer target data. That is, if the same data as the original data is written, the filter unit 7 does not store this write data in the buffer unit 8.

The Addresses X, Y, Z are excluded out of the transfer targets, and the filter unit 7 does not store any data thereof in the buffer unit 8.

Thus, the filter unit 7 judges whether or not the write data is the transfer target data, and stores the write data defined as the transfer target data in the buffer unit 8. Further, the filter unit 7 stores the buffer unit 8 with the Byte Mark defined as data representing a different point between the original data and the write data.

Figure 21:
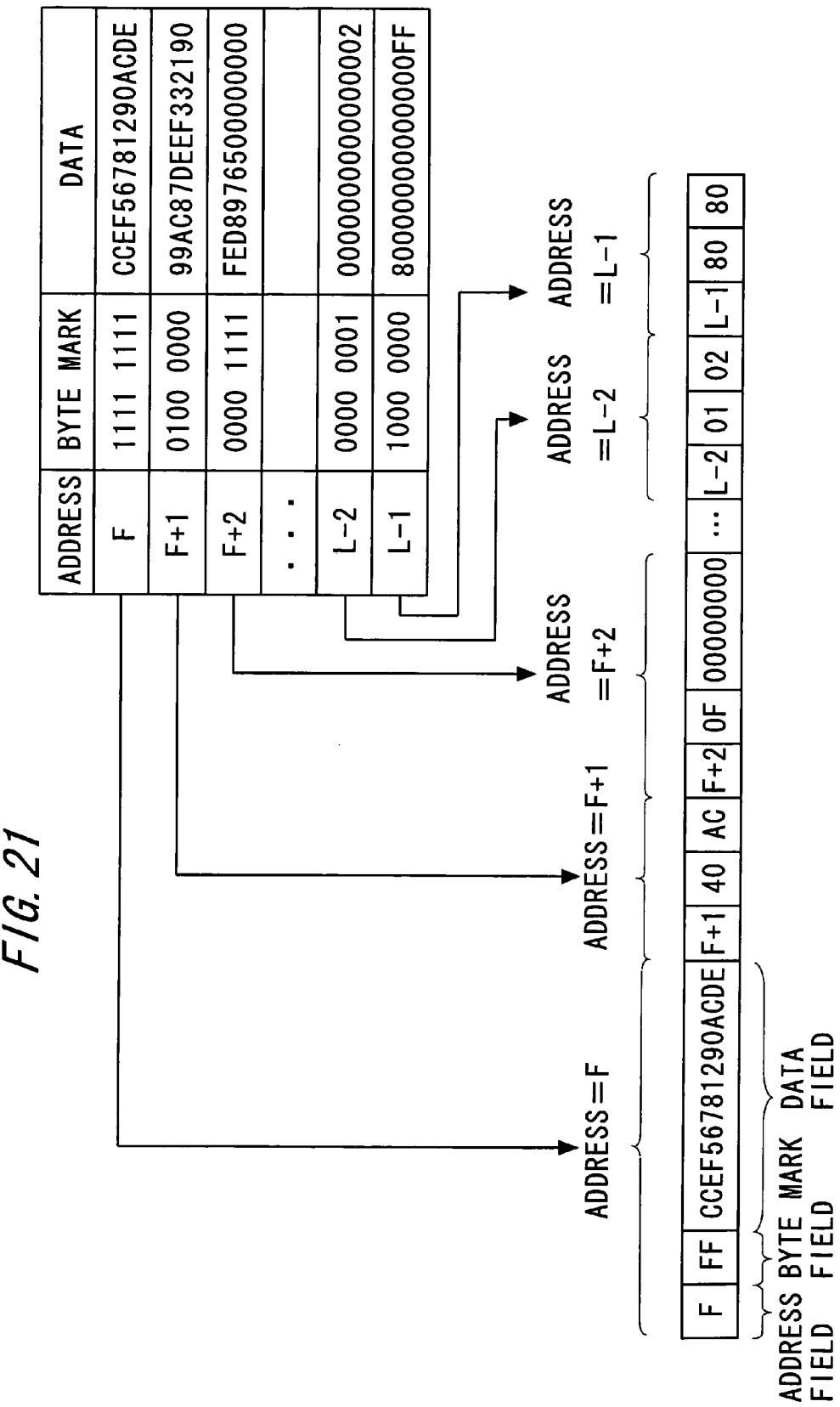
FIG. 21 is an explanatory diagram of an operation example of compression in the present embodiment.

FIG. 21 is an explanatory diagram showing an operation example of the compression according to the present embodiment. FIG. 21 shows the example in which the compression/decompression unit 9 compresses respective pieces of Data stored in the Addresses F, F+1, F+2, . . . , L-2, L-1 of the buffer unit 8.

As shown in FIG. 21, after the compression, the Address field and the Byte Mark field are each set as a fixed length field, while the Data field is set as a variable length field. The Data field is set as the variable length field, whereby only the different value(s) of the write data from the original data can be entered in the Data field.

In the case of the Address F, "F" is entered in the Address field, and "FF" is entered in the Byte Mark field. As shown in FIG. 20, the original data of the Address F and the write data of the Address F are different in all the values. In this case, "CCEF56781290ACDE" is entered in the Data field. The compression/decompression unit 9 converts pieces of data "F", "11111111", "CCEF56781290ACDE" stored in the buffer unit 8 into data such as "F", "FF", "CCEF56781290ACDE", and transfers these pieces of data to the transfer unit 10.

Further, in the case of the Address F+1, "F+1" is entered in the Address field, and "40" is entered in the Byte Mark field. As shown in FIG. 20, different values between the original data of the Address F+1 and the write data of the Address F+1 are "00" in the original data and "AC" in the write data. Therefore, "AC" is entered in the Data field. The compression/decompression unit 9 converts pieces of data "F+1", "01000000", "99AC87DEEF332190" stored in the buffer unit 8 into data such as "F+1", "40", "AC", and transfers these pieces of data to the transfer unit 10.

Thus, the compression/decompression unit 9 converts only the different values between the original data and the write data, and transfers the converted values to the transfer unit 10, thereby enabling the transmitting data to be compressed.

In a case where the information processing device on the receiving side decompresses the compressed transmitting data, the compression/decompression unit 9 judges a data length from a bit count of the Byte Mark field. For instance, when "F" is entered in the Address field and "FF" is entered in the Byte Mark field, the data entered in the Data field is "CCEF56781290ACDE". In this case, the compression/decompression unit 9 extracts "CCEF56781290ACDE" contained in the transmitting data, and stores this data in the Data field of the buffer unit 8. Moreover, the compression/decompression unit 9 stores "F" in the Address field, which is contained in the transmitting data, in the Address field of the buffer unit 8. Furthermore, the compression/decompression unit 9 stores the Byte Mark field of the buffer unit 8 with, as (8-bit data of) "11111111", the data "FF" in the Byte Mark field, which is contained in the transmitting data. In this case, "FF" in the Byte Mark field is "11111111" in binary number, and hence the compression/decompression unit 9 can judge a data length of the Data field.

Further, for example, when "F+1" is entered in the Address field and "40" is entered in the Byte Mark field, the data entered in the Data field is "AC". In this case, the compression/decompression unit 9 extracts "AC" contained in the transmitting data and stores this data in the Data field of the buffer unit 8. Moreover, the compression/decompression unit 9 stores the Address field of the buffer unit 8 with "F+1" in the Address field that is contained in the transmitting data. Still further, the compression/decompression unit 9 stores the Byte Mark field of the buffer unit 8 with, as "01000000", the data "40" in the Byte Mark field, which is contained in the transmitting data. In this case, "40" in the Byte Mark field is "01000000" in binary number, and hence the compression/decompression unit 9 can judge a data length of the Data field.

Thus, the compression/decompression unit 9 refers to the Byte Mark field and can thereby judge the different value(s) between the original data and the write data. Then, the compression/decompression unit 9 can extract only the different value(s) between the original data and the write data from the transmitting data. As a result, the compression/decompression unit 9 can store the buffer unit 8 with only the different value(s) between the original data and the write data.

Figure 22:
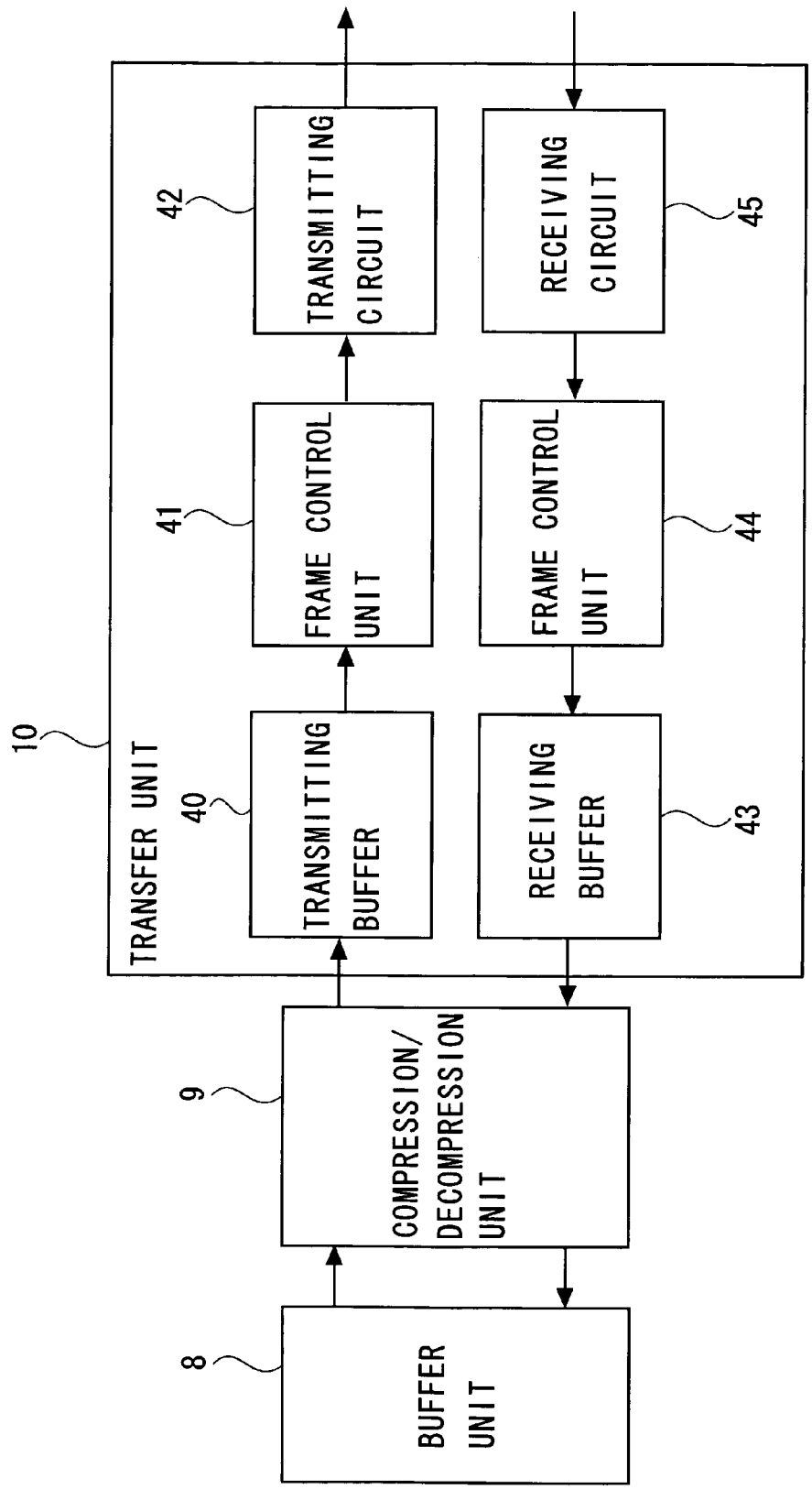
FIG. 22 is a block diagram of a transfer unit 10.

FIG. 22 is a block diagram of the transfer unit 10. The transfer unit 10 is constructed of a transmitting unit and a receiving unit. The transmitting unit is constructed of a transmitting buffer 40, a frame control unit 41 and a transmitting circuit 42. The receiving unit is constructed of a receiving buffer 43, a frame control unit 44 and a receiving circuit 45. For example, the transfer unit 10 can be actualized by a network interface card such as a NIC 3.

In a case where the information processing device on the receiving side writes the transmitting data to the memory unit 5, the filter unit 7 writes the data stored in the buffer unit 8 to the memory unit 5. The buffer unit 8 of the information processing device on the receiving side is stored with only the rewritten data in the memory unit 5 of the information processing device on the transmitting side. Accordingly, only the data stored in the buffer unit 8 of the information processing device on the receiving side may simply be written to the memory unit 5.

According to the present embodiment, the information processing device on the transmitting side can transmit only the data rewritten in the memory unit 5 to the information processing device on the receiving side. Further, according to the present embodiment, the information processing device on the receiving side writes the data received from the information processing device on the transmitting side to the memory unit 5, thereby enabling the data rewritten in the memory unit 5 of the information processing device on the transmitting side to be reflected in the memory unit 5 of the information processing device on the receiving side.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

<Others>

The disclosures of Japanese patent application No. JP2006-191597 filed on Jul. 12, 2006 including the specification, drawings and abstract are incorporated herein by reference.

What is claimed is:

1. A single information processing device capable of configuring an information system that maintains matching between information retained by a self device and information retained by a partner device in a way that links up a plurality of information processing devices with each other, the information processing device comprising:

a plurality of bit lines and a plurality of word lines that are so arranged as to intersect in positions different from each other;

a storage unit including memory cells, each of the memory cells are selected by designating each of the bit lines and each of the word lines, and comparing units to compare the information presently being retained by each of the memory cells with information written afresh to each of the memory cells;

an extracting unit to extract the information written afresh to each of the memory cells about which the comparing units judge that the information presently being retained is different from the information written afresh; and a transmitting unit to transmit the extracted information to the partner device linking up with the self device, wherein each memory cell includes:

a capacitance unit to retain a first type of information or a second type of information; and a column switch unit to control a connection of the capacitance unit to the bit line via which to input and output, and each comparing unit includes:

a first change detecting unit to output a third type of information if the information retained by the capacitance unit is categorized as the first type of information and if the information inputted to the bit line is categorized as the first type of information, to output a fourth type of information different from the third type of information if the information retained by the capacitance unit is categorized as the first type of information and if the information inputted to the bit line is categorized as the second type of information, and to detect a change from the first type of information to the second type of information; and a second change detecting unit to output the third type of information if the information retained by the capacitance unit is categorized as the second type of information and if the information inputted to the bit line is categorized as the second type of information, to output the fourth type of information different from the third type of information if the information retained by the capacitance unit is categorized as the second type of information and if the information inputted to the bit line is categorized as the first type of information, and to detect change from the second type of information to the first type of information, and the first change detecting unit includes:

a first transistor containing a gate electrode connected to the capacitance unit; and a second transistor containing a gate electrode connected to the bit line, and the second change detecting unit includes:

a third transistor containing a gate electrode connected to the capacitance unit; and a fourth transistor containing a gate electrode connected to the bit line.

2. An information processing device according to claim 1, wherein the extracting unit extracts composite information containing the information written afresh to each of the memory cells about which the comparing units judge that the information presently being retained is different from the information written afresh and containing the information written afresh to each of the memory cells about which the comparing units judge that the information presently being retained is not different from the information written afresh, the information processing device further comprises a compression unit to compress the composite information on the basis of the fourth type of information, and the transmitting unit transmits the compressed composite information to the partner device.

3. An information processing device according to claim 2, further comprising a receiving unit to receive the compressed composite information transmitted by the partner device, wherein the compression unit decompresses the compressed composite information received by the receiving unit.

* * * * *